(12) United States Patent
Taylor, Jr.

(10) Patent No.: US 6,301,377 B1
(45) Date of Patent: Oct. 9, 2001

(54) GEL ELECTROPHORESIS IMAGE WARPING

(75) Inventor: John Taylor, Jr., Clayton, NC (US)

(73) Assignee: Large Scale Proteomics Corporation, Germantown, MD (US)

( * ) Notice: Subject to any disclaimer, the term of this patent is extended or adjusted under 35 U.S.C. 154(b) by 0 days.

(21) Appl. No.: 09/643,675

(22) Filed: Aug. 24, 2000

Related U.S. Application Data

(60) Provisional application No. 60/157,830, filed on Oct. 5, 1999.

(51) Int. Cl.$^7$ ............................................. G06K 9/00
(52) U.S. Cl. ................................................... 382/129
(58) Field of Search ..................... 382/129, 293, 382/294, 295, 228; 435/6; 536/23.1

(56) References Cited

U.S. PATENT DOCUMENTS

| | | | |
|---|---|---|---|
| 5,833,827 | * 11/1998 | Anazawa et al. ...................... | 204/603 |
| 5,949,899 | * 9/1999 | Ng ........................................ | 382/129 |
| 5,983,251 | * 11/1999 | Martens et al. ....................... | 708/203 |
| 6,064,754 | * 5/2000 | Parekh et al. ......................... | 382/129 |
| 6,118,127 | * 9/2000 | Liu et al. .............................. | 250/458.1 |
| 6,132,578 | * 10/2000 | Kambara et al. ..................... | 204/451 |
| 6,150,089 | * 11/2000 | Schwartz ................................. | 435/6 |
| 6,163,620 | * 12/2000 | Hojnacki et al. ..................... | 382/162 |

OTHER PUBLICATIONS

"Information extraction from 2D electrophoresis images" by Thompson et al., conference of the IEEE engineering in medicine and biology society, vol. 20, No. 2, 1998.*

"Biologist's perspective on analytical imaging systems as applied to protein gel electrphoresis" by Wayne, Journal of chromatography A. 698 (1995) 55–87.*

* cited by examiner

Primary Examiner—Andrew W. Johns
Assistant Examiner—Shervin Nakhjavan
(74) Attorney, Agent, or Firm—Roylance, Abrams, Berdo & Goodman, L.L.P.

(57) ABSTRACT

A computer-implemented image processing method and apparatus for warping a plurality of gel electrophoresis images is provided. The method includes the steps of assigning tiepoints in a reference image and in one or more object images. The tiepoints in the object image are evaluated one-by-one by comparison to regions about a corresponding tiepoint in the reference image, and the location of the tiepoint in the object image is adjusted by slight movement to a location with respect to recognizable features in both the reference and object image thereby defining a tiepoint pair linking a location in the reference image with a location in the object image. outlier tiepoint pairs may be rejected if that pair does not meet predetermined conditions. Warping functions are generated and then globally optimized. The plurality of images are tied together using the tiepoint pairs such that all of the images may be subsequently warped into registration to a single base image selected from the plurality of images.

49 Claims, 19 Drawing Sheets

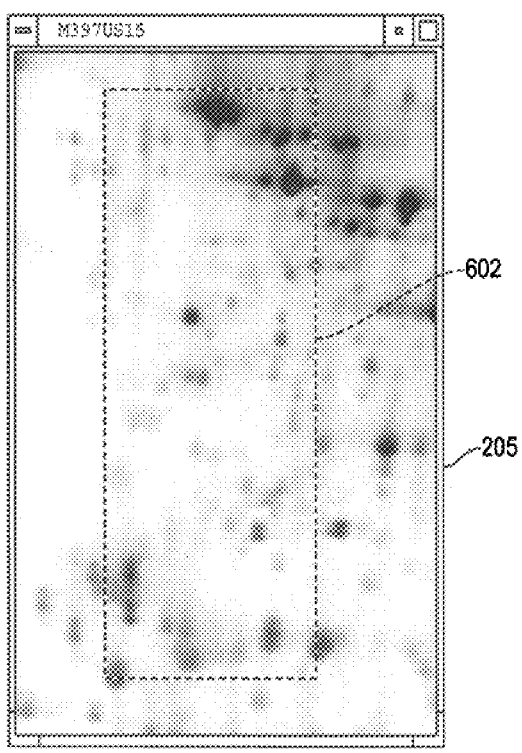
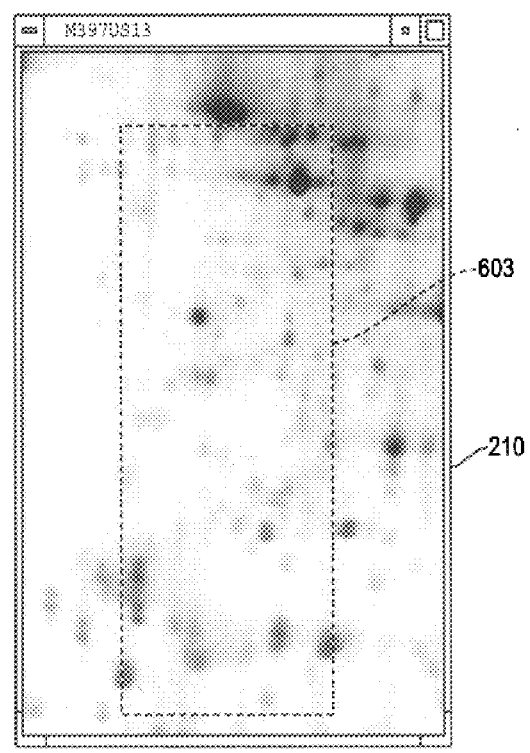
REFERENCE IMAGE
FIG. 12A
OBJECT IMAGE
FIG. 12B

GEL ELECTROPHORESIS IMAGE WARPING

This application claims priority to United States Provisional Application No. 60/157,830, filed Oct. 5, 1999.

BACKGROUND OF THE INVENTION

1. Field of the Invention

The present invention relates generally to a computer-implemented image processing method for processing a plurality of similar images, and more particularly to a computer-implemented image processing method for warping a plurality of similar gel electrophoresis images in order to bring the images or portions thereof into registration with one another. The present invention further relates to a computer adapted to perform the image processing method.

2. Description of the Background Art

The term registration is often used with respect to printing processes to indicate the correct relation or exact superimposition between colors in color printing. In the present invention, the term registration refers to superimposition and alignment of features in a plurality of images where the features include a common pattern, or portions of a common pattern in each image, the pattern being identifiable by the naked eye and/or computer.

The term image processing is generally considered to mean the computerized manipulation of images or sets of images in order to facilitate the extraction of information, either by visual inspection or by automated measurement. Image processing is commonly used to enhance the usefulness of an image by changing the intensity, contrast, borders, size, placement, etc., of an image or features in the image. Image processing is also used to identify, locate and/or measure features represented within the image.

An image processing algorithm is a set of steps that may be automatically and rapidly applied to an image by a computer. Computers and digital electronics have brought about a multitude of ways in which images may be processed and manipulated. Numerous mathematical algorithms may be used, and image data may be processed on the level of individual pixels (in computer terms, a pixel is a basic picture element and is the smallest unit of visual information in an image). Image warping is a type of image processing which deals with geometric transformations to image features.

Warping refers to a process of applying geometric corrections to modify the shape of features and to change their spatial relationships. Another term used for a warping process is rubber-sheeting because the warping process can be likened to stretching a rubber sheet wherein portions of one or more images are stretched or shrunk in order to bring the spots on all the images into registration with one another and still maintain relative positional relationships between the spots.

One area in which computer-implemented image processing is useful is in the area of macromolecular analysis. Modern medicine has made great advances through the study of body chemistry and cell components. Living tissue is made up of a vast array of macromolecules, or large molecules, which perform a vast array of functions. Macromolecules, their identity, placement, and function, are important for many reasons, including, for example, drug actions and interactions, drug concentrations, body chemistry, DNA and RNA analysis, protein detection, protein generation, etc. Macromolecular analysis is particularly useful in stained gel applications, and may encompass applications such as, for example, protein analysis, DNA analysis, RNA analysis, etc. Large scale automation and computer processing are needed because of the huge numbers of component combinations that must be identified.

Macromolecular analyses often involve one or more electrophoresis steps. Electrophoresis is a process wherein macromolecules suspended in a liquid or gel are subjected to an electrical field, physically separating particles on the basis of inherent electrical charges and/or size. A typical macromolecular analysis has several general steps. First, a test sample containing a test material to be analyzed is prepared. The prepared test sample is then electrophoresed to separate components of the test sample. The electrophoresis separation may be performed in one or more dimensions. A two-dimensional electrophoresis process creates a two-dimensional distribution of components throughout the electrophoresis gel. The electrophoresis is generally followed by a staining step wherein a stain is bonded to a certain type of molecule contained in the macromolecules of the test material. Typical stains include visible and fluorescent stains. In a two-dimensional electrophoresis gel the staining creates a two-dimensional pattern of components. These components generally appear as small (usually elliptical) objects commonly call "spots".

One method and corresponding apparatus for performing two-dimensional electrophoresis is described in U.S. Pat. No. 5,993,627, which is incorporated herein by reference in its entirety.

In repetitious processing of a biological cellular sample using two-dimensional separation techniques, various portions of the cellular material are separated in predictable patterns where the spots of macromolecular material consistently separate and migrate to locations on the gel relative to one another creating a recognizable two-dimensional pattern. For a given type of sample, for instance, proteins from rat liver tissue, a reproducible pattern of spots emerges during the staining process mentioned above. The pattern is mappable in that the approximate location of one spot is predictable relative to the location of other spots.

In a comparison between images of two different gels from similar samples, the pattern will typically be readily recognized. However, if one image is superimposed over the other image, the patterns of spots on the two different gels will not necessarily align with one another. Due to the soft and flexible nature of the gel material, the gels themselves may suffer from physical distortion or shifting of a spot or group of spots in the pattern contained in the image. In other words, various spots or groups of spots of the pattern will be located in the vicinity of their predicted relative location but will not necessarily be in alignment with the recognizable pattern known from another gel. Similarly, images of a single gel taken at different times during a staining process may not be aligned, though distortions will be less than experienced with two images of two different gels.

In order for a computer to process images representing the spots on two or more gel images, and produce meaningful information based upon comparison of two or more gels images, it is advantageous for the images to be brought into registration with one another. Specifically, the recognizable patterns of spots must be brought into alignment with one another in order for a comparison of one spot on a first gel image to be compared to the corresponding spot on other gel images. Therefore, there is a need for computer implemented process for bringing corresponding spots on one gel into registration with spots on one or more other gels. Once a pattern of spots on one gel image is brought into registration with the pattern of spots on another gel image, the computer can make meaningful comparisons between corresponding spots, such as size and density information.

The spots in a pattern may also be analyzed and compared with a known pattern, also referred to as a master pattern. The master pattern is a pattern where previously observed spots have been mapped and may be numbered or indexed for identification. Information concerning the make-up of an indexed spot may or may not be known, however the location of the spot relative to other spots on a gel is known. The indexing specifically identifies a relative location of the spot in the master pattern, and may include further information about the spot such as identification of the specific cellular material concentrated in that spot.

The pattern analysis step is critical, because even if the process is carefully controlled up to this point, a poor quality pattern analysis may yield incorrect, confusing, or misleading results. This is because the size, physical location, and intensity of electrophoresed spots may be used to determine the macromolecular components of a sample under test.

During the above mentioned staining process, due to levels of concentration of material in a particular spot on the gel, and other factors, some spots become very large and the image of that spot may be blurred. For instance, some spots may in fact be several spots that are very close to one another making the distinction between the spots difficult. Therefore, there is a need for a method for determining during the staining process the true nature of an overly large spot.

In macromolecular analysis methods where a carrier, such as a gel slab, is immersed in a developer or stain, individual spots may become visible at different rates, so that over a selected period of time, spots and patterns of spots may appear, darken, and ultimately reach saturation. There is no single point in time that yields optimal visualization for all objects in the image simultaneously. Therefore, there is a need to study a gel at different times in the staining process.

SUMMARY OF THE INVENTION

One object of the present invention is to provide a computer-implemented method for aligning multiple images to put the multiple images in registration with one another.

A computer-implemented image processing method for warping a plurality of homologous gel electrophoresis images is provided according to a first aspect of the invention. The method comprises the steps of selecting a base image from the plurality of images; assigning multiple tiepoints in each of the homologous images, each tiepoint connecting a region of one image to an approximate corresponding region of one other image; adjusting tiepoints to maximize similarities between regions around the tiepoints; rejecting those tiepoints inconsistent with other tiepoints; creating warping functions based upon the remaining tiepoints; optimizing parameters of the warping functions to bring the tiepoints of each image into good alignment with corresponding tiepoints in other images; and warping each of the images using the warping functions to bring the plurality of images into registration with one another.

The method of the present invention may be used to rotate, translate, shift, stretch and/or shrink portions of images to bring spots in the images into registration with one another.

A computer-implemented image processing apparatus for warping a plurality of homologous gel electrophoresis images is provided according to a second aspect of the invention. The apparatus comprises an image capturing device and a computer having a memory and communicating with the image capturing device, the computer capable of receiving and storing into the memory a plurality of gel electrophoresis images from the image capturing device, the computer being further capable of warping the plurality of gel electrophoresis images according to the method described above.

The above and other features and advantages of the present invention will be further understood from the following description of the preferred embodiment thereof, taken in conjunction with the accompanying drawings.

BRIEF DESCRIPTION OF THE DRAWINGS

FIGS. 12A and 12B show further portions of the two electrophoresis images depicted in FIGS. 11A and 11B, with a control frame designated in the object image and a corresponding correlation region in the reference image used for determining the location of a tiepoint in the object image in accordance with one embodiment of the present invention;

DETAILED DESCRIPTION OF THE INVENTION

Overview

Figure 1:
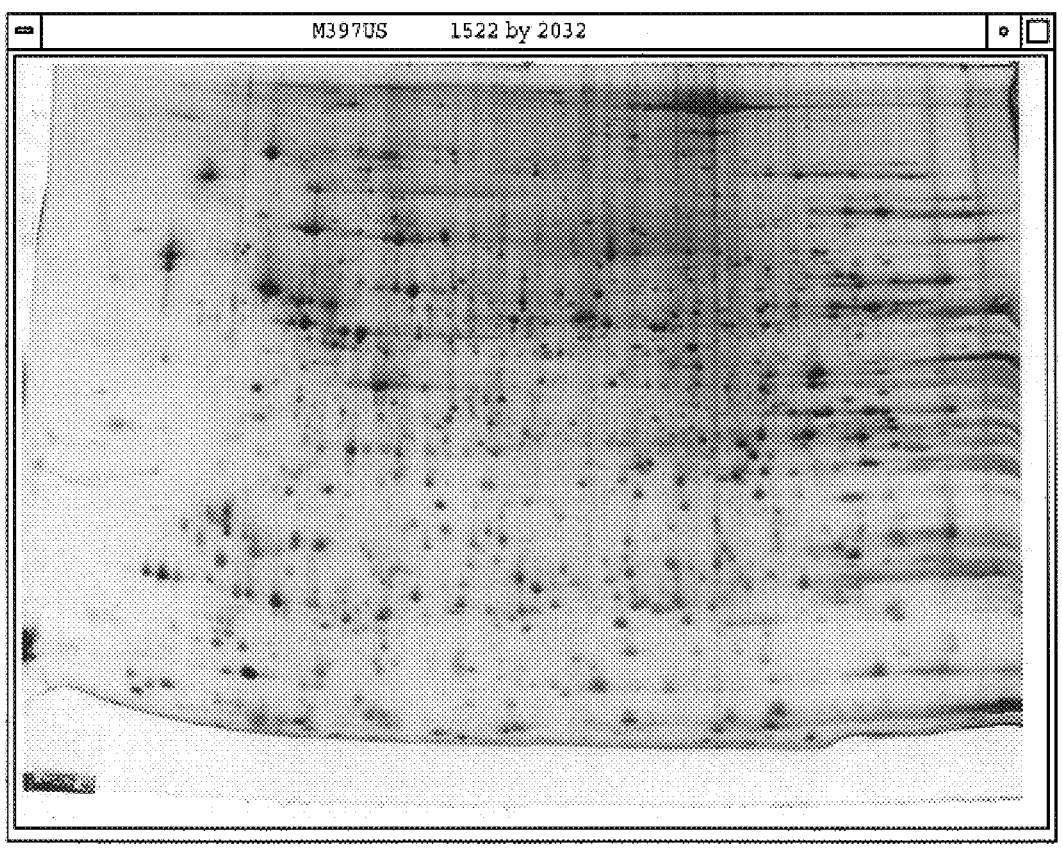
FIG. 1 shows a gel electrophoresis image, of a plurality of other electrophoresis images.
Figure 2:
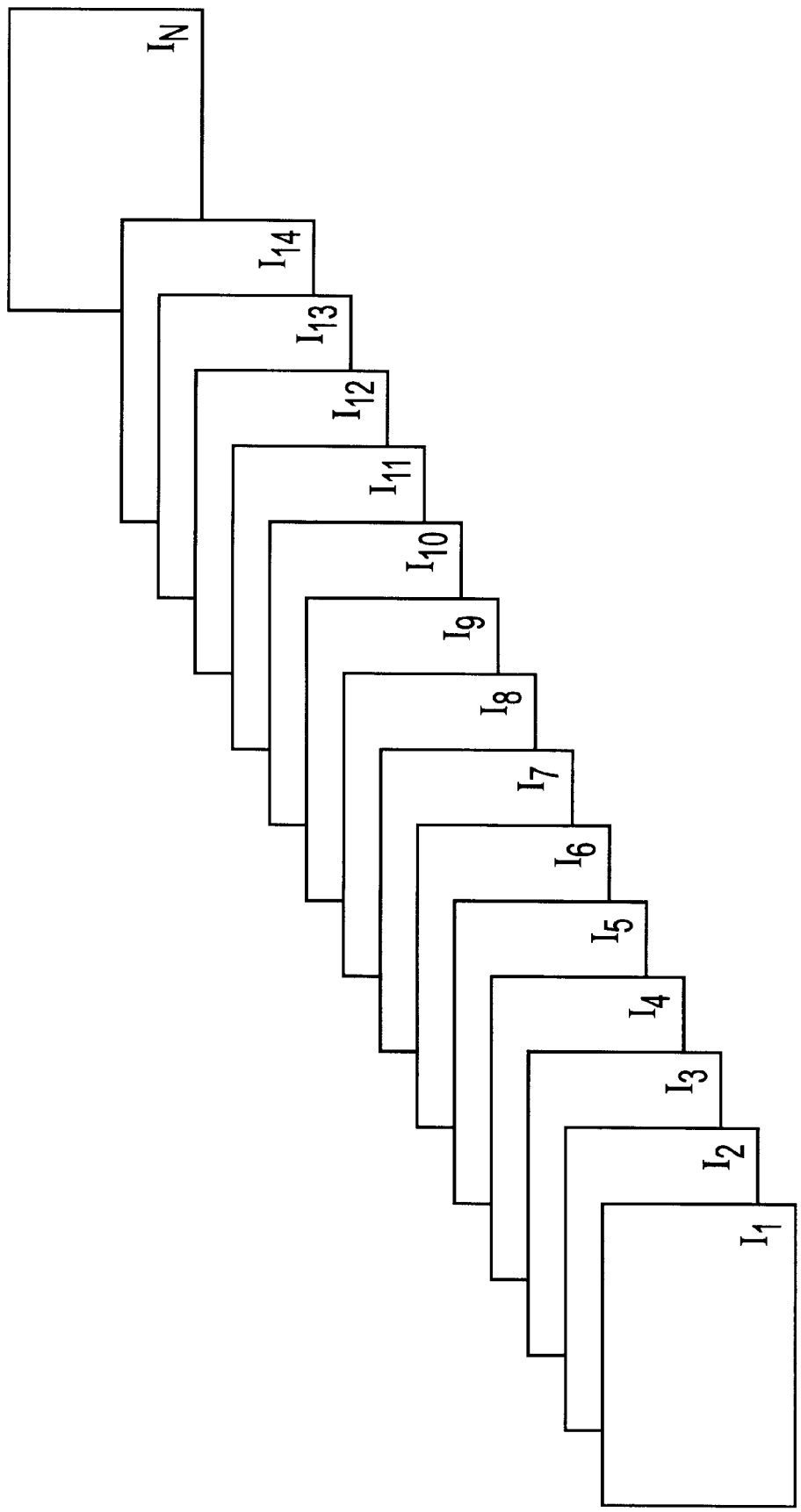
FIG. 2 is a block diagram showing a plurality of electrophoresis images such as the image of FIG. 1.

FIG. 1 shows an example of an image of a two dimensional electrophoresis gel produced by an electrophoresis process and then further subjected to a stain development process. Many spots representing separated polypeptides are clearly defined in the scanned image. Construction, electrophoresis and processing of such gels, is well known in the art. Such gels are prepared and studied in order to produce meaningful data resulting from the polypeptides separated by electrophoresis. FIG. 2 is a diagram representing a plurality of scanned electrophoresis gel images $I_1$ through $I_N$. Groups of electrophoresis gels are often examined in comparative studies. The significance of the plurality of images depicted in FIG. 2 will become apparent from the following description.

Computer implemented processing of such images in accordance with the present invention is performed in a variety of situations. For example, in the usage of the present invention, the images $I_1$ through $I_N$ could be any of the following:

1) A plurality of images of a single gel taken at predetermined time intervals during the staining process (time lapse imaging);
2) A plurality of images of a single gel taken at different exposures;
3) A plurality of images of different gels to be compared to one another;
4) A plurality of images of different gels to be compared to one another, where one image is a master pattern; and
5) A plurality of images of different gels compared for subsequent formation of a master pattern. Although the present invention may be used with any of the above groups of multiple images, detailed description of the present invention is provided below with respect to a plurality of images of a single gel taken at predetermined time intervals that are to be compared to one another.

Multiple images are captured during a development period of an electrophoresis gel. Typically, the dominant features of these images are small elliptical objects commonly called spots visually recognizable in FIG. 1. In the preferred embodiment, a gel electrophoresis analysis may include a series of images, such as the images $I_1$ thru $I_N$, taken over time during the staining process, with patterns being essentially unchanged between images except that individual spots may grow bigger and darker as the staining process progresses. More detail on the electrophoresis process and staining may be found in U.S. Pat. No. 5,993,627 to Anderson, et al., which is incorporated herein by reference.

A plurality of images is produced by scanning a single gel at predetermined time intervals as the gel is being stained. Scanning is performed by a camera or CCD, such as the PENTAMAX-3072-K-3, marketed by PRINCETON INSTRUMENTS, now ROPER SCIENTIFIC, Trenton N.J. For instance, the gel may be scanned every 30 seconds, every minute, every three minutes or other desirable time periods. Taking multiple scans during stain development is required in order to maximize the information about both faint and intense objects. However, the staining process typically requires total submersion of a gel in a staining solution. Formation of multiple scans of a gel requires taking the gel out of the staining solution in order to scan the gel, or requires temporarily pressing the gel against a transparent surface of a staining tank in order to scan the gel. After each scan, the gel must be removed from contact with the transparent surface in order to develop further. Such a transparent surface of a staining tank is disclosed in commonly assigned co-pending U.S. patent application Ser. No. 09/504,492, entitled "AGITATOR FOR GEL ELECTROPHORESIS PROCESSING TANK", which is incorporated herein by reference.

In the apparatus disclosed in the co-pending application, a gel is repeatedly pressed against the transparent side of the tank for scanning. The gel is held against the side of the tank only long enough for a single scan of the gel to produce a single image. After each scan, the gel is allowed to hang freely within the tank in order for the staining process to proceed. After the predetermined time period has elapsed, the gel is again pressed against the transparent side of the tank for another scan. The scanning process continues throughout the staining process generating a plurality of gel images, such as the images $I_1$ through $I_N$ depicted in FIG. 2. However, the gel is soft and pliable and is not likely to contact the transparent surface in exactly the same position each time a scan is performed. Therefore, the multiple images of the single gel obtained over time while staining, are not likely to be aligned with one another. Therefore, it is necessary to bring the multiple images into registration with one another. The present invention, as described below, provides a means for bringing each of the multiple images into proper registration with one another. Bringing the multiple images into registration with one another is important so that both faint and intense spots may be considered during each phase or step in the staining process. For instance, an intense or large spot may actually be two small spots that have merged into one larger spot during the staining process. Consideration of only the completely stained gel image might not reveal two spots.

There are situations where gels are stained with fluorescent dies. For fluorescently-stained gels, the gel is typically scanned using a CCD or other type of camera (suitably filtered to accept light at the emission wavelengths) while illuminating the gel with a light source operating at the proper excitation wavelengths. The dynamic range will be influenced by the combination of illumination and exposure settings. Again there may be no single combination of settings that is optimal for quantifying all objects in the image simultaneously. Faint objects will not be visible at short exposures and intense objects will be saturated at the longer exposures. Multiple scans with different exposure and/or illumination settings are required in order to maximize the obtainable information.

For the cases described above, multiple images are used in order to maximize the dynamic range and obtain quantitative information about both faint and intense objects or spots in the images.

Regardless of the form, meaningful data is best derived with the spots in the scanned images in alignment with one another (in registration with one another). One purpose of the present invention, is to bring multiple images of a single gel into registration with one another. With the spots of multiple images in alignment with one another, meaningful comparisons can be made between the multiple scans and/or a master pattern, and the images may further be combined to create a single composite image, as is discussed in commonly assigned co-pending U.S. patent application Ser. No. 09/387,728 filed Sep. 1, 1999, entitled "Gel Electrophoresis Image Combining for Improved Dynamic Range", and is incorporated herein by reference in its entirety.

Figure 3A:
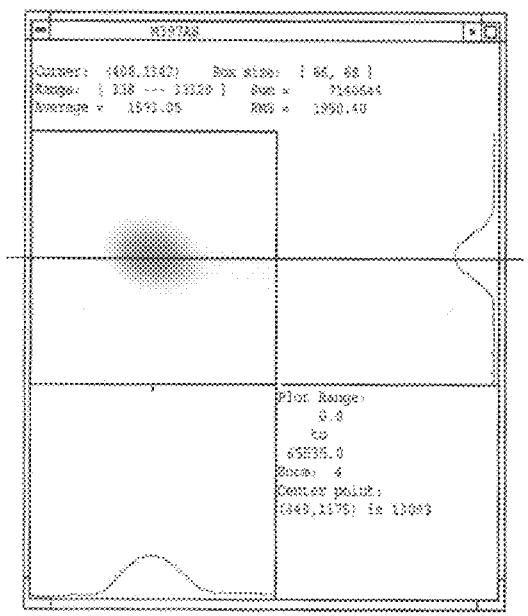
FIGS. 3A and 3B show portions of two electrophoresis images, comparing corresponding regions of the two images, where the two images are of a single electrophoresis gel taken at different times during stain development.
Figure 3B:
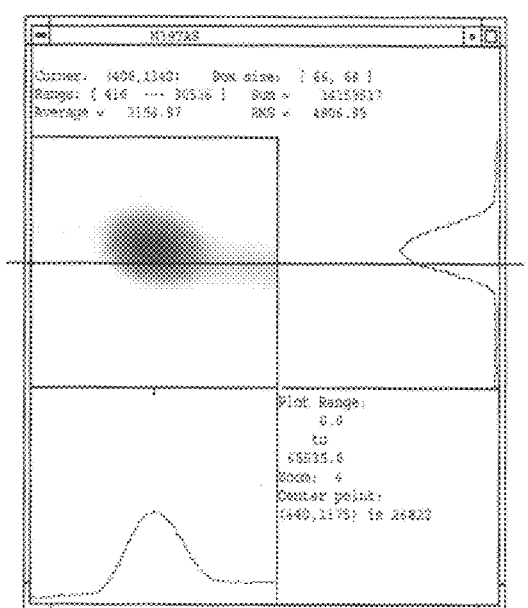

FIGS. 3A and 3B show a comparison of corresponding small regions of two images of the images $I_1$ through $I_N$ scanned several minutes apart during the development process. The images are not in registration with one another because the gel was moved between scans. The spot shown in FIG. 3A is the same spot shown in FIG. 3B, however, the gel images of the two spots are offset from one another (not in registration with one another). In each of FIGS. 3A and 3B, the spot has measurable features that may be represented by X-axis dimensions, Y-axis dimensions, and intensity levels for each pixel. These dimensions are further represented in FIGS. 3A and 3B, by gaussian graphs, specifically, an X-axis graph and a Y-axis graph that indicate the length and intensity for the spot along each respective axis. For the depicted region in the two images, the spot in FIG. 3B appears to be shifted one or two pixels upward from the corresponding spot in FIG. 3A (each small square visible in the image is a pixel). As is explained in greater detail below, these two corresponding spots are subsequently put into registration or aligned with each other along with other spots in the images in accordance with the present invention.

Description of Hardware

Figure 4:
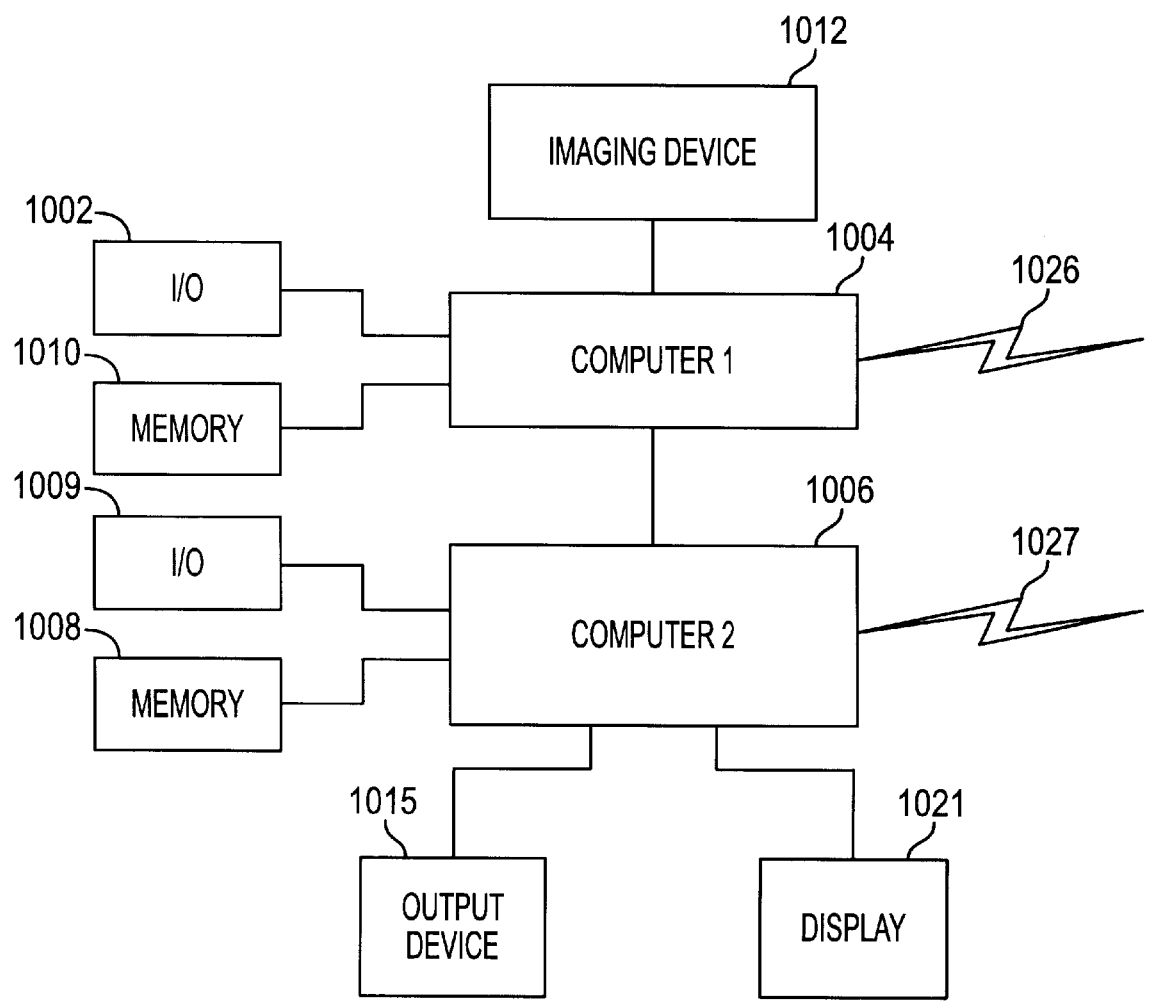
FIG. 4 is a block diagram showing a computer system and scanner for making images of electrophoresis gels and warping the images in accordance with one embodiment of the present invention.

FIG. 4 is a block diagram schematically showing a computer system utilized for effecting the present invention. The computer system includes an imaging device 1012, such as the above mentioned camera, PENTAMAX-3072-K-3, marketed by PRINCETON INSTRUMENTS, now ROPER SCIENTIFIC, Trenton N.J. The imaging device 1012 is able to capture the plurality of images depicted in FIG. 2. The imaging device 1012 is connected to a computer 1004 having an I/O device 1002 that controls the imaging device 1012 and temporarily stores the images taken by the imaging device 1012 in memory 1010. The computer 1004 is connected to another computer, computer 1006. The computer 1006 includes memory 1008 and an I/O device such as a mouse, keyboard or the like. The computer 1006 is further connected to a display 1021 and an output device 1015.

It should be understood that although computers 1004 and 1006 are shown, the two computers can be one and the same computer. For instance, the computer 1006 may alternatively be connected directly to the imaging device 1012, eliminating the computer 1004 from the system.

The computer 1006 may be any type of general purpose computer such as a personal computer. The computer 1006 receives gel electrophoresis images from the computer 1004. In the preferred embodiment the computer 1004 is directly connected to the computer 1006, but alternatively may communicate with the computer 1006 via a modem and telephone line, via a computer network such as the Internet, LAN, etc. Further the captured images may alternatively be stored on a removable storage media by the computer 1004, and the removable storage media can then be transferred to the computer 1006. Removable storage media includes removable disks, such as CD-ROMs, ZIP disks, or MO disks or removable hard drives.

When gel electrophoresis images are received by the computer 1006, the images are stored in the memory 1008. The memory 1008 may be one or more types of memory, such as random access memory (RAM), read-only memory (ROM), magnetic disk, tape or card, or optical memory. Multiple images may be stored, processed, and combined. The resultant plurality of warped gel electrophoresis images may also be stored in the memory 1008.

The optional output device 1015, optional display 1021, and optional communications link 1027 may be used before, during, or after the processing of the plurality of gel electrophoresis images. The optional output device 1015 may include a printer. The optional display 1021 may include a computer monitor, LCD screen, or cathode ray tube.

The computer 1004 may include an optional communications link 1026. The optional communications links 1026 and 1027 may include a telephone link (and associated modem, not shown) or a computer network link (and associated network interface card, not shown).

In operation, the imaging device 1012 captures the plurality of images of an electrophoresis gel. The computer 1006 receives the plurality of gel images, warps them into a desired placement or into alignment, and may then output the resultant plurality of warped images in some manner, such as through a printout or visual display. The resultant plurality of warped gel electrophoresis images may be stored and may be used to analyze a macromolecular composition of a sample under test.

Figure 5:
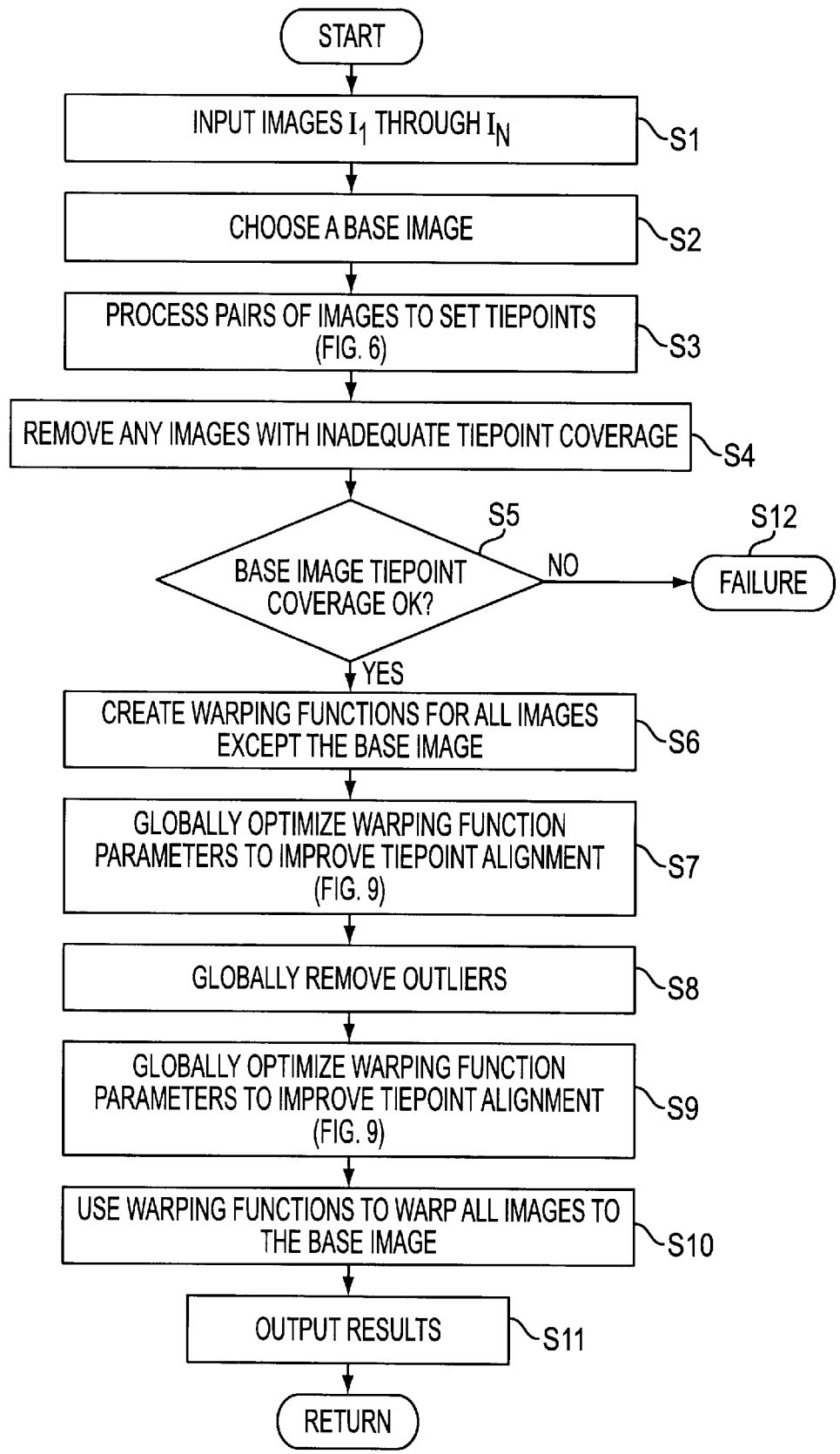
FIG. 5 is a flowchart showing operational steps of a method in accordance with one embodiment of the present invention.

General Operation Flowchart (FIG. 5)

FIG. 5 is a flowchart showing the general steps of a method of one embodiment of the present invention effected by the computer system depicted in FIG. 4. Images $I_1$ through $I_N$, depicted in FIG. 2, are generated by the imaging device 1012 and inputted into the computer 1006, as indicated in FIG. 5 at step S1. At step S2, a base image is selected from the images $I_1$ through $I_N$. The base image is preferably the only image of the plurality of images that is not warped. Preferably, all or almost all of the other images are subsequently warped into registration with the base image, as is described in greater detail below. The base image may be manually selected or may be selected as an image in the middle of the array of images $I_1$ through $I_N$, for instance image $I_{N/2}$. However, the base image may be any of the images $I_1$ through $I_N$.

At step S3, the images are processed in a manner described in greater detail below with respect to the flowcharts in FIGS. 6 through 8 in order to establish tiepoint pairs linking features of the plurality of images $I_1$ through $I_N$ together for subsequent warping. As is described in greater detail below, tiepoint pairs are location links between two images. One tiepoint is located in a first of a pair of images and the second tiepoint is located in the second image. The location of the second tiepoint is determined by an evaluation of features in the two images, as is described in greater detail below.

Specifically, the images $I_1$ through $I_N$ are evaluated in pairs to establish location links between homologous portions in the pairs images. The links are first established by selecting a pair of images, designating one of the pair of images as a reference image (not necessarily the base image) and the other of the pair images as an object image. Multiple points are assigned to the reference image. Location links between regions of the reference image and regions of the object image are established by finding regions of the object image that are homologous to regions about each tiepoint in the reference image. For each tiepoint in the reference image, features in the homologous region in the object image are compared to features in the reference image in order to establish a location for a corresponding tiepoint in the object image, thereby defining a tiepoint pair, as is described in greater detail below with respect to FIGS. 6, 7 and 8.

At step S4 in FIG. 5, images of images $I_1$ through $I_N$ that have inadequate tiepoint coverage linking that image at least one other image is designated as unwarpable and are removed from the subsequent warping procedure (described below). Inadequate tiepoint coverage can be determined by any of a variety of methods. For instance, a specific number of tiepoint pairs can be designated as a threshold for acceptable tiepoint coverage. Additionally or alternatively, a determination of inadequate tiepoint coverage can be based upon the relative location of tiepoint pairs. Specifically, if the tiepoint pairs are all concentrated in only a small portion of the pair of evaluated images then there may be inadequate tiepoint coverage.

At step S5, a decision is made whether or not there are sufficient location links established between the base image and the other images of the plurality of images. Specifically, a consideration is made with respect to the number of tiepoint pairs established between the base image and other images of the plurality of images. If there is sufficient coverage of tiepoints, then the process moves to step S6 where warping function or functions are created for warping all of the images to the base image. If there is not sufficient coverage, the process terminates at step S12. Step S6 is described in greater detail below after the description of FIGS. 7 and 8.

Figure 8:
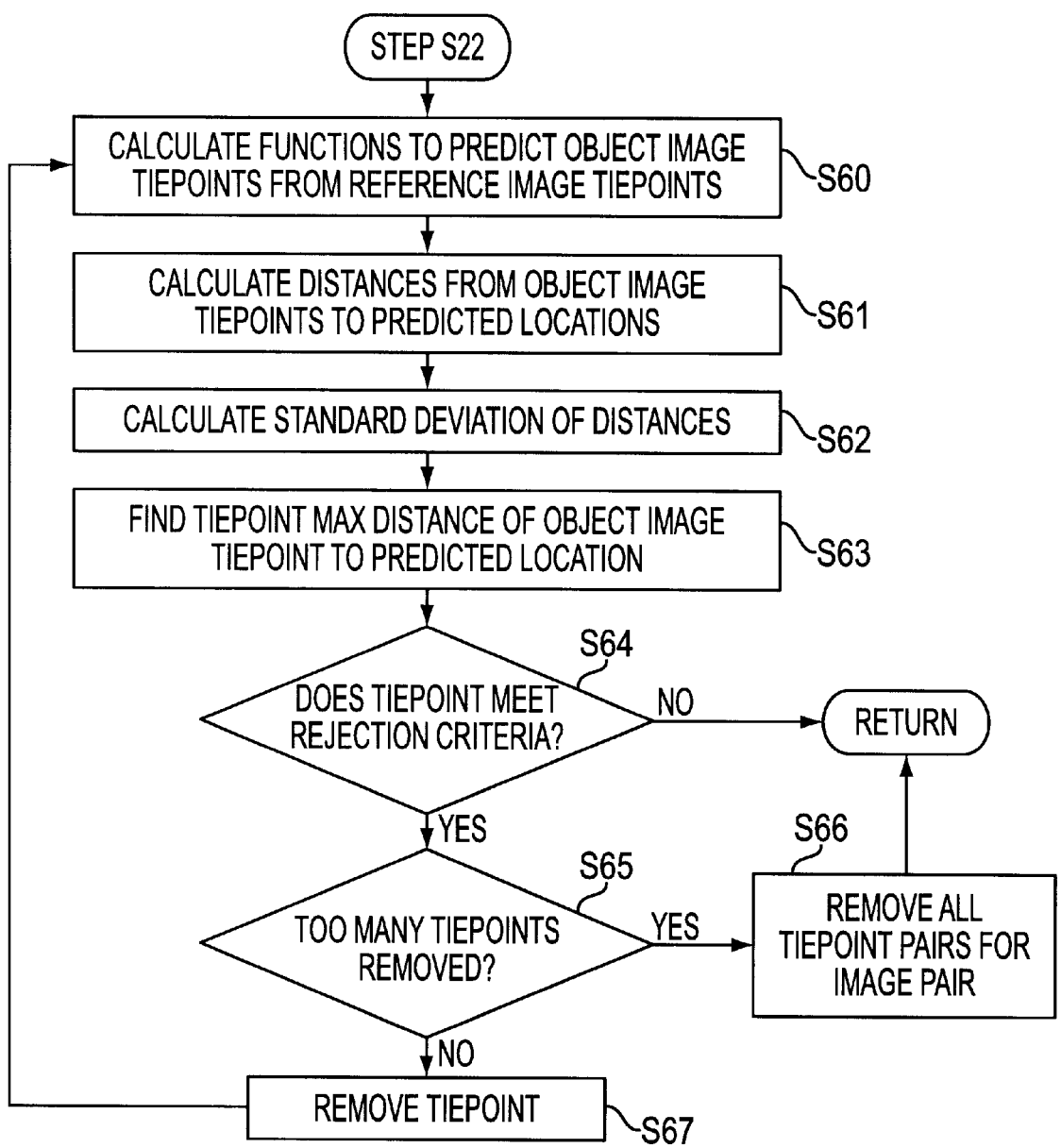
FIG. 8 is a flowchart showing steps of an outlier rejection process in accordance with one embodiment of the present invention.
Figure 9:
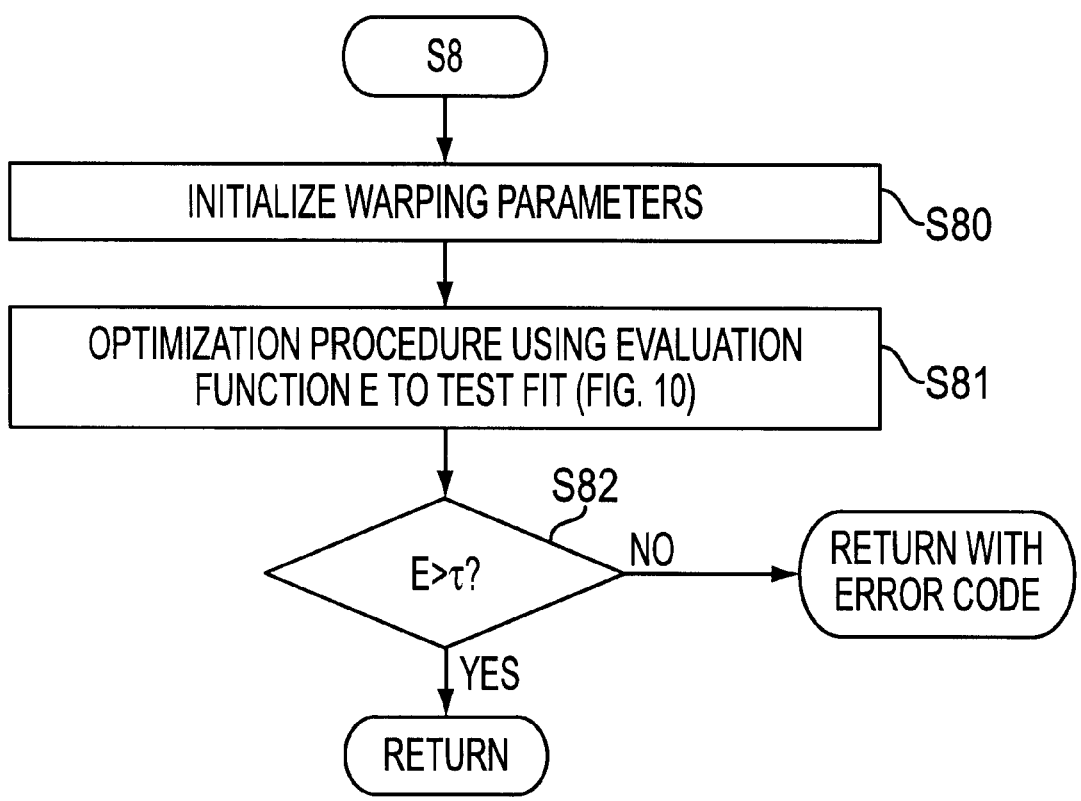
FIGS. 9 and 10 are flowcharts showing steps of warping parameter optimization in accordance with one embodiment of the present invention.
Figure 10:
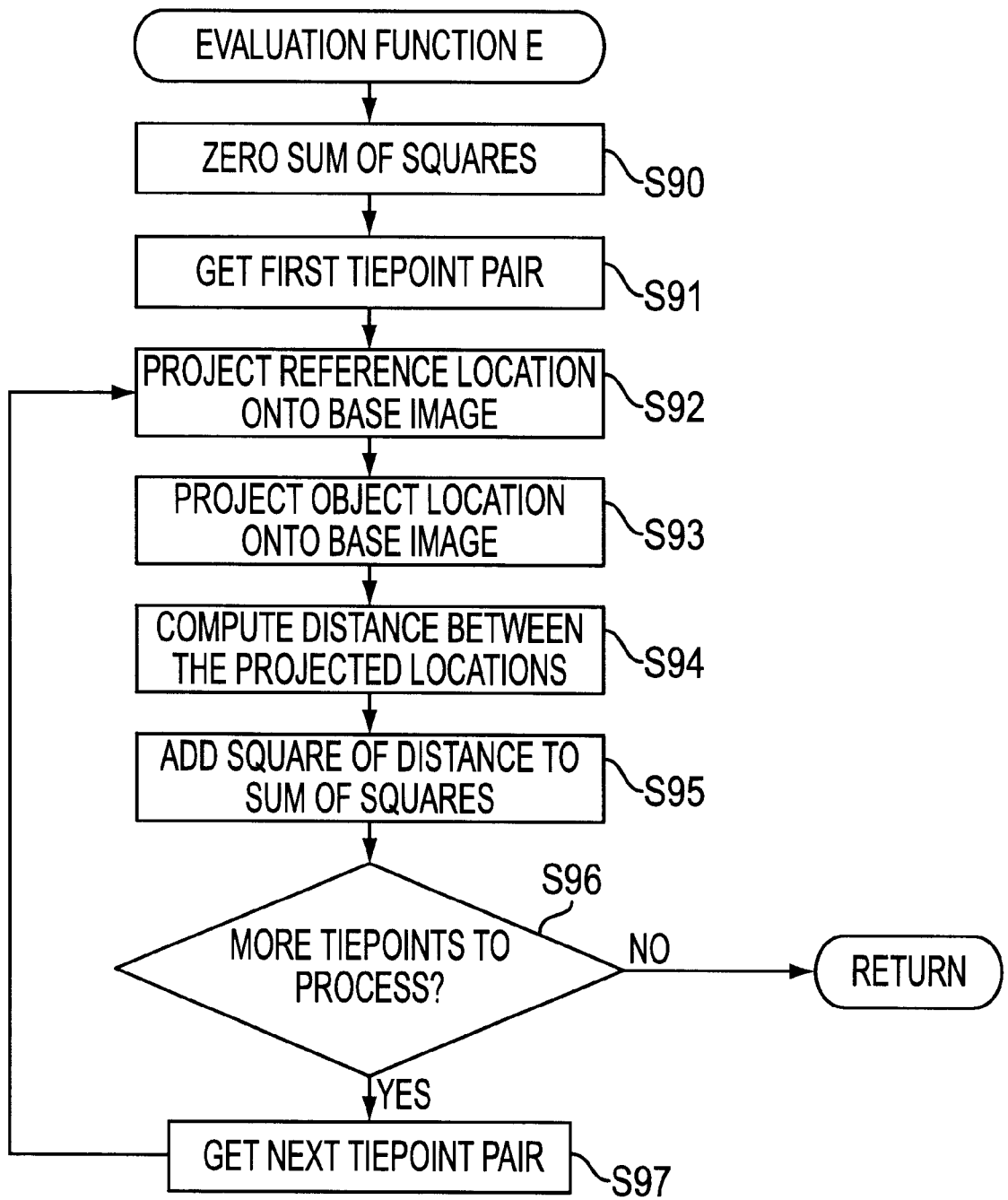

After creation of the warping functions in step S6, an optimization process at step S7 proceeds to globally optimize the warping function parameters to improve the tiepoint alignment, as is described in greater detail with respect to FIGS. 9 and 10. Next, at step S8, a global evaluation of all tiepoint pairs is conducted to remove any further outliers. The operation performed in step S8 is similar to the outlier removal operation performed at step S22, except that the inverse of the warping functions is used to project the location links (tiepoint pairs) from all of the plurality of images back onto the base image. The operations performed at step S22 in FIG. 6 are described below with respect to FIG. 8. Since the operations at step S22 and step S8 are generally the same, except for the functions used, duplicative description is omitted.

Next, at step S9, another optimization process generally the same as the operations at step S7 proceeds to again globally optimize the warping function parameters to improve the tiepoint alignment, as is described in greater detail with respect to FIGS. 9 and 10. Since outliers are removed at step S8, the optimization step at step S7 is repeated again at step S9 to further improve the tiepoint alignment.

Next, at step S10, using the warping functions created at step S6 and optimized at steps S7 and step S9, all of the images are warped to the base image bringing them into registration with one another.

The functions derived in the method of the present invention may rotate, translate, shift, stretch and/or shrink portions of the images to bring spots identified in all images into registration with one another and with the base image.

At step S11, the results of the warping are output and the process ends. It should be understood that the output may be in the form of a series of images all in registration with one another and/or, the data may be alpha/numeric or numeric data including information relating to relative location of each spot, width and intensity information.

Steps S7 and S9 utilize generally the same procedures. However, for some combinations of image pair analysis (described further below with respect to FIGS. 14–17) one or the other of steps S7 or S9 may not be necessary, but rather may be optionally performed.

Determining Tiepoint Pair Locations (Step S3)

Figure 6:
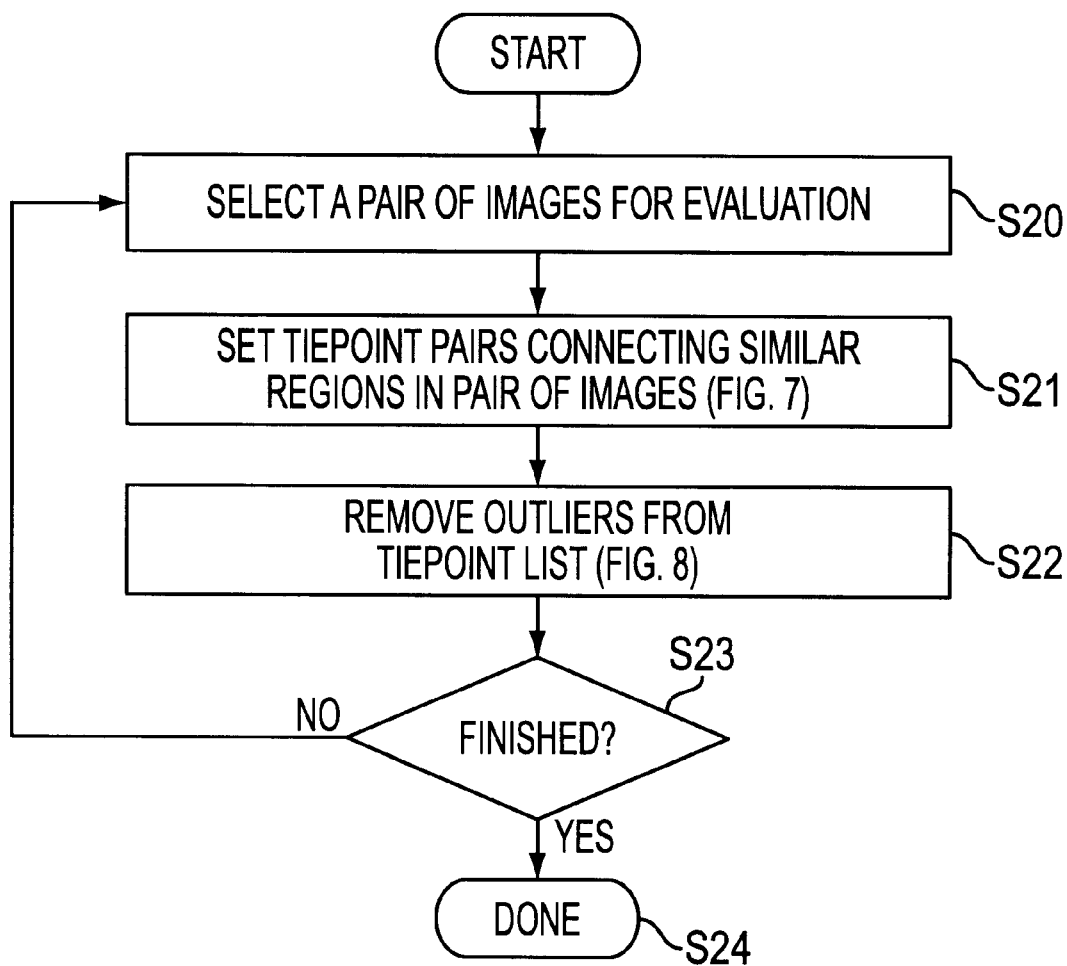
FIG. 6 is another flowchart showing details of one of the steps of the flowchart depicted in FIG. 4 in accordance with one embodiment of the present invention.

Step S3 in FIG. 5 comprises several steps that are indicated in FIG. 6 and described in greater detail below.

In step S20 in FIG. 6, a pair of images is selected for evaluation. One image of the pair is designated as a reference image 205 and the other image is designated as an object image 210, as depicted in FIGS. 11A, 11B, 12A, 12B and 13 and described further below. The reference image 205 is chosen from among the plurality of gel electrophoresis images $I_1$ through $I_N$. In the preferred embodiment, the evaluation of the images is conducted in pairs, each pair consisting of a reference image and an object image. It should be understood that the reference image may be the base image, however, it is not necessary for the reference image to be the base image, as is will become clearer in the explanation below.

The object image 210 selected at step S20 for evaluation is chosen from any of the images $I_1$ through $I_N$, but may not be the selected reference image 205. The object image 210 is, for example, the first image $I_1$ taken in the time-lapse image obtaining process and the reference image 210 may be image $I_8$.

Some examples of the actual grouping of the images in the pair by pair evaluation of images is described with respect to FIGS. 14, 15, 16, 17 and 18. For example, for the pair by pair evaluation of images, a single base image $I_B$, which is $I_8$ in FIG. 14, may be selected as the only reference image in the pair by pair evaluation of images. In the example depicted in FIG. 14, each of the images $I_1$ through $I_N$ is evaluated as an object image 210 by comparison to the reference image $I_8$. In other words, each pair by pair evaluation includes image $I_8$, with image $I_8$ being designated as the reference image.

However, the reference image does not necessarily need to be the base image. For instance, in FIG. 15, the images $I_1$ through $I_N$ are evaluated in a domino fashion, where image $I_1$ and $I_2$ are evaluated as a pair, one of the two images $I_1$ and $I_2$ being a reference image, the other being an object image. Next, image $I_2$ and $I_3$ are evaluated as a pair, one of the two images $I_2$ and $I_3$ being a reference image, the other being an object image, and so on. In the example depicted in FIG. 15, image $I_8$ is the base image and all other images are subsequently warped to image $I_8$, as is described in greater detail below.

Figure 16:
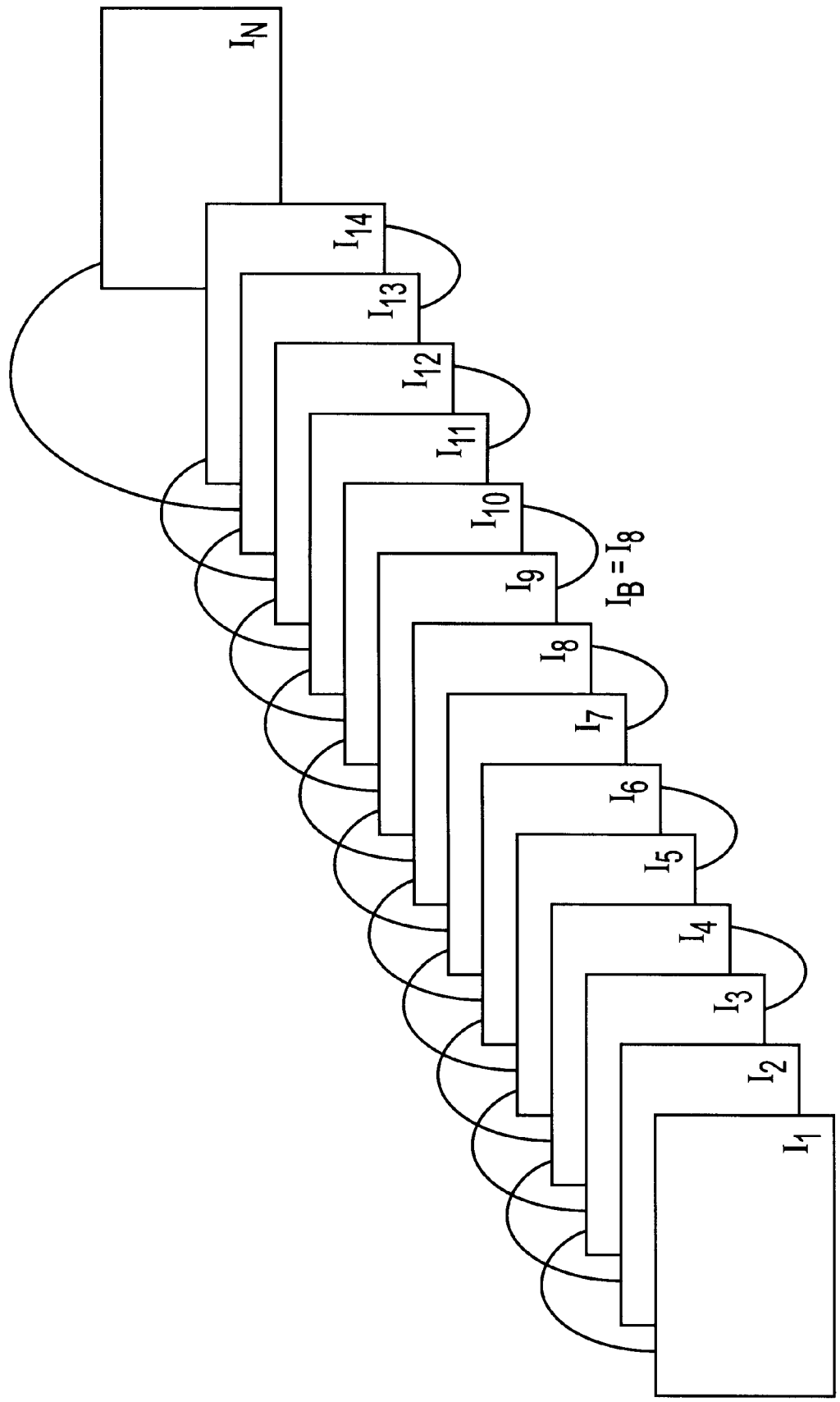
FIG. 16 is a block diagram showing another example of a plurality of electrophoresis images grouped for tiepoint evaluation in accordance with one embodiment of the present invention.

Further, as shown in FIG. 16, the images $I_1$ through $I_N$ may also be evaluated in alternating pairs where image $I_1$ and $I_3$ are evaluated as a pair, one of the two images $I_1$ and $I_3$ being a reference image, the other being an object image. Next, image $I_2$ and $I_4$ are evaluated as a pair, one of the two images $I_2$ and $I_4$ being a reference image, the other being an object image, and so on. In order to tie the alternating pairs of images to one another, several adjacent pairs of images need to be evaluated in order to adequately link all images together. For instance, image $I_3$ and $I_4$, image $I_5$ and $I_6$, image $I_7$ and $I_8$, and so on may further be evaluated in order to insure reliable linking between all images and the base image $I_8$.

Figure 17:
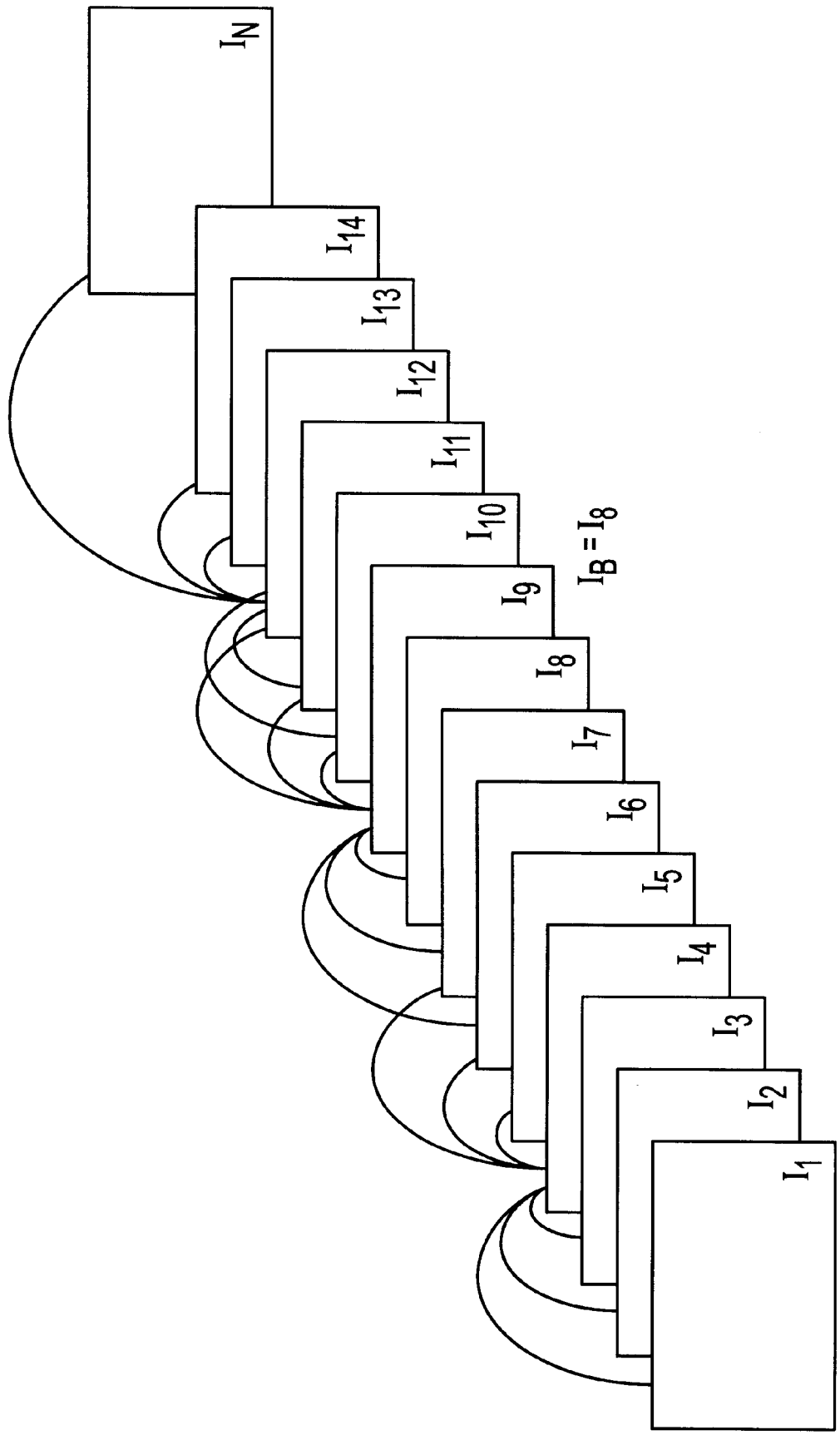
FIG. 17 is a block diagram showing another example of a plurality of electrophoresis images grouped for tiepoint evaluation in accordance with one embodiment of the present invention.

Further, as shown in FIG. 17, the images $I_1$ through $I_N$ may also be evaluated in pairs where three or four images, for instance images $I_4$, $I_9$, and $I_{12}$, are reference images in the pair by pair evaluation of images. Specifically, the following pairs of images are evaluated one by one with image $I_4$ being the reference image for each evaluation: images $I_1$ and $I_4$, image $I_2$ and $I_4$, images $I_3$ and $I_4$, image $I_4$ and $I_5$, images $I_4$ and $I_6$ and image $I_4$ and $I_7$. Next, the following pairs of images are evaluated pair by pair with image $I_9$ being the reference image for each evaluation: images $I_9$ and $I_7$, image $I_9$ and $I_8$, images $I_9$ and $I_{10}$, image $I_9$ and $I_{11}$, and so on.

It should be appreciated that a variety of groupings in the pair by pair evaluations are possible in order to provide reliable links between the images. For instance, the images may be randomly paired.

The pair of images selected for evaluation at step S20 in FIG. 6 may be predetermined prior to starting the warping process or may be a set feature of the method of the present invention. Preferably, in most of the pairs evaluated, the reference image of each pair of evaluated images is selected from an image other than the base image. However, the base image must be evaluated with at least one other image in the pair by pair evaluations. In other words, the base image may be the only reference image in the pair by pair evaluations, or may be one of several reference images in the pair by pair evaluations, but preferably, images other than the base image are selected as the reference image(s).

Evaluation of images in the pair by pair evaluation described above produces a extensive array of tiepoint pairs (location links) between the various images in a group of images. Greater numbers of links between the various images provides a more reliable warping process.

Figure 11A:
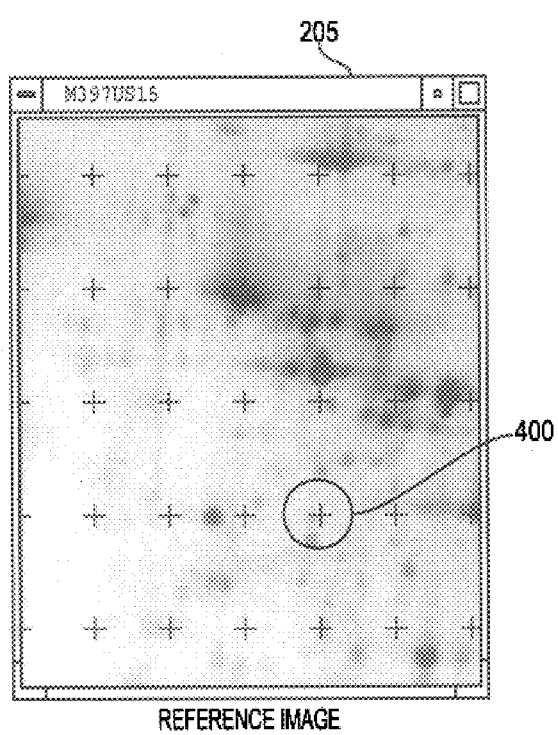
FIGS. 11A and 11B show portions of two electrophoresis images, with a plausible region designated in an object image corresponding to a tiepoint assigned to a reference image in accordance with one embodiment of the present invention.
Figure 11B:
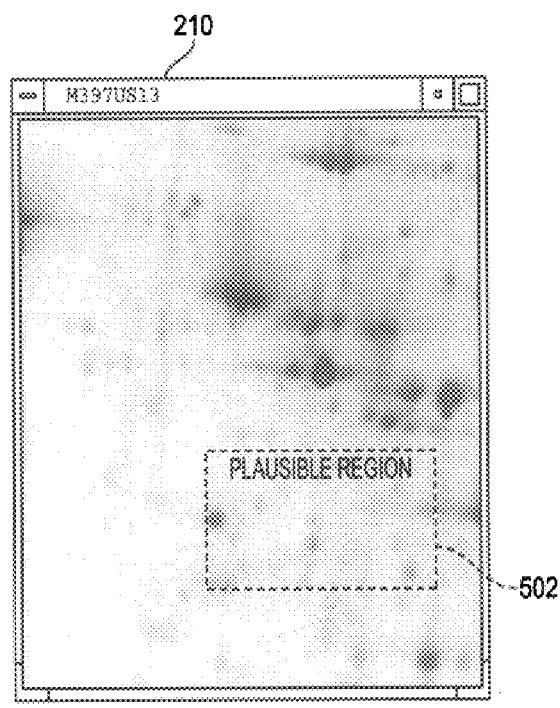

Returning to FIG. 6, at step S21 tiepoints are systematically assigned to the reference image 205, as indicated in FIGS. 11A and 11B. A region of the object image 210 is then evaluated to determine a tiepoint location in the object image linking that region of the object image to a region around the corresponding tiepoint in the reference image 205, as explained in greater detail below with reference to FIGS. 7, 11A and 11B.

Each pair of tiepoints includes two (x,y) coordinates, each coordinate consisting of a magnitude of distance along an x-axis and a magnitude of distance along a y-axis in a Cartesian coordinate system assigned to each image. The first coordinate is assigned to a location on the reference image 205. The second coordinate at a specific location in the object image is determined by evaluating features in the object image 210 that correspond to features in the reference image around the set of first coordinates. Once a suitable location has been identified in the object image, the second coordinate is established and fixed as a tiepoint in the object image. The tiepoint in the reference image and the determined tiepoint in the object image define a tiepoint pair. The tiepoints pairs are used in accordance with the present invention to link features in the object image to features in the reference image for subsequent warping of the images into registration with one another, as explained in greater detail below.

Returning to FIG. 6, at step S22 outliers are removed from the tiepoint list. Outliers are tiepoint pairs that do not meet predetermined criteria. For instance, one pair of tiepoints may require warping of the corresponding portion of the image beyond a preset limitation indicating that the tiepoint pair under consideration may not link appropriate features of the object image to features of the reference image. Further, imperfections in the gel or glass that supports the gel may appear in the images, may be the source of such outliers and therefore must be eliminated. The process represented by step S22 is explained in greater detail below with respect to FIG. 8.

At step S23 in FIG. 6, a decision is made whether or not all tiepoint pairs have been considered. If more pairs remain for evaluation, then the process returns to step S20. If all possible pairs of images have been evaluated, then the process is completed and operational control returns to step S4 in FIG. 5.

Tiepoint Pair Evaluation (Step 21)

Figure 7:
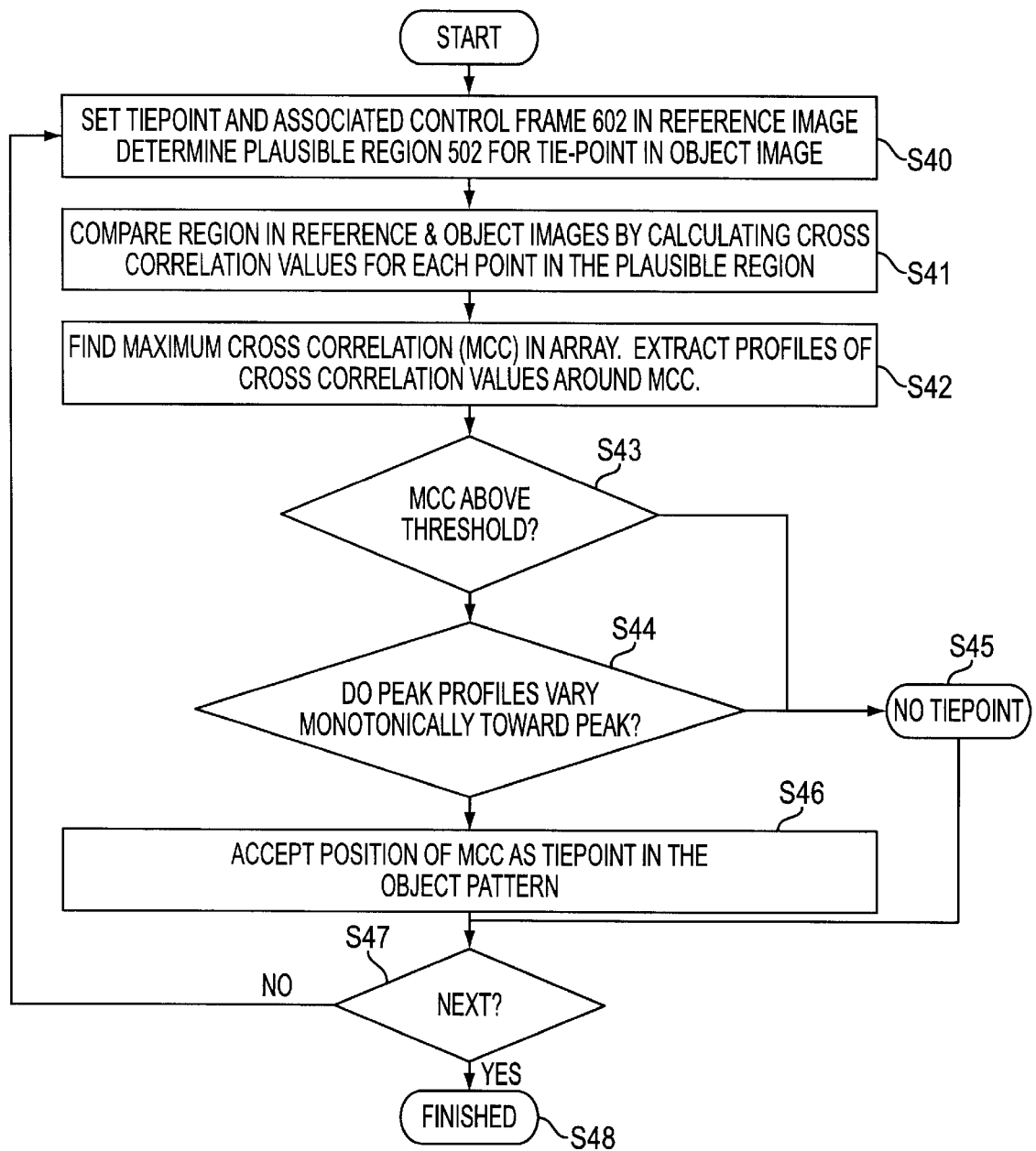
FIG. 7 is a flowchart showing steps for determining tiepoint locations in the object images in accordance with one embodiment of the present invention.

FIG. 7 is a flowchart corresponding to step 21 in FIG. 6 showing one example of steps for finding a location link between a tiepoint in the designated reference image and a corresponding region in the designated object image. In step S40, several actions are taken. First, a tiepoint 400 is set in the reference image 205, as indicated in FIGS. 11A and 11B. Also in step S40, a plausible region 502 (FIGS. 11A and 11B) is determined for the object image.

Tiepoint locations outside of the plausible region 502 are subsequently rejected during the evaluation process, as is described further below. In the preferred embodiment, the plausible region 502 is a rectangular box centered on the approximate location of the tiepoint in the reference image. Since the two images are considered to be images of the same gel, it is safe to assume that the images are not too far off from being in registration and therefore the approximate location is a good starting point for the evaluation. The size of the plausible region 502 is adjusted to accommodate the maximum distance of offset between the reference image and object image.

FIGS. 12A and 12B show larger portions of the reference image 205 and the object image 210, including the portions depicted in FIGS. 11A and 11B, but on a slightly reduced scale. At step S40, a control frame 602 is created in the reference image 205, as shown in FIGS. 12A and 12B. In the preferred embodiment the control frame 602 is centered about the selected tiepoint of the reference image 205. However, the control frame 602 may reference the tiepoint in alternative manners. For instance, the control frame 602 may be positioned with the tiepoint at a corner or other position with respect to the control frame.

The size of the control frame 602 (FIGS. 12A and 12B) is preferably large enough to contain several spots or other recognizable image details, but small enough so that image distortion is not appreciable from one side of the frame to the other.

Also in step S40, a correspondingly located cross-correlation frame 603 is created in the object image 210 (see FIGS. 12A and 12B). The cross-correlation frame 603 is an area that is moved within the object image during the evaluation process. The cross-correlation frame 603 preferably has a center that lies within the plausible region 502. The cross-correlation frame 603 encompasses a plurality of pixels, and the intensity values and other parameters (such as x-width and y-width). The features within the cross-correlation frame 603 are evaluated by comparing them to features in the control frame 602 in order to determine the best spot in the object image for location of a link to the tiepoint 400, thereby establishing a tiepoint pair. The features that are compared include the intensity values and other parameters of the pixels in the control frame 602 in order to determine the optimal location of a link in the object image 210 to the tiepoint 400 in the reference image 205. However, it should be understood that other methods of evaluation are possible.

At step S41, an array of cross-correlation numbers is calculated for the cross-correlation frame 603 in the object image. The cross-correlation numbers indicate similarities between regions about prospective tiepoint link locations in the plausible region and features in the cross-correlation frame 603. Similarly, correlation numbers are also calculated for distances between the tiepoint 400 and features in the control frame 602 in the reference image 205. In essence, the cross-correlation numbers provide a means for comparing locations in the control frame 602 with locations in the cross-correlation frame 603 to determine the optimal location of the link in the object image corresponding to the location of the tiepoint 400 in the reference image 205 thereby establishing a tiepoint pair.

Cross-correlation values in the preferred embodiment are calculated using a fast Fourier transform (FFT), although alternatively other methods may be used. The correlation number may range from −1 to +1. The correlation number reflects the degree of similarity between the image intensity values of the cross-correlation frame 603 and the control frame 602. In the preferred embodiment, a cross-correlation number is calculated for each point in the plausible region, producing a two-dimensional array of cross-correlation numbers. In the preferred embodiment, the FFT generates an approximation (not exact because of edge conditions) of this correlation array without having to repeat the calculations for every point.

In step S42, a maximum cross-correlation number (MCC) is found. The location of the maximum cross-correlation number will determine the tiepoint position (or link) in the object image 210. In addition to finding the MCC, in the preferred embodiment two other conditions are imposed. First, the calculated MCC preferably exceeds a predetermined threshold, as indicated at step S43. In the preferred embodiment this threshold is 0.65, but may range from about 0.4 to about 0.8. If the MCC is above the threshold, then the tiepoint pair being evaluated is rejected, as indicated at step S45. Second, in step S44, the cross-correlation values for neighboring points must decrease monotonically in both the X and Y directions from the detected maximum point for at least several pixels (typically 4 or 5 pixels). If the peak profiles do not vary monotonically, then the tiepoint pair under evaluation is deleted from the tiepoint pair list, as indicated at step S45. Thus the cross-correlation region 603 is positioned in such a way as to match the control frame 602 of the base image. At step S46, the tiepoint location in the object image 210 is recorded based upon the position of the MCC. At step S47, a determination is made whether or not all tiepoints have been evaluated within the pair of images. If not, then the process repeats with a next tiepoint pair evaluated at step S40.

Tiepoints are initially assigned to the reference image 205 in a grid of evenly spaced points covering the entire reference image 205, although it should be understood that the tiepoints might be assigned randomly, or in any pattern. The exact method for selecting the tiepoints in the reference image 205 is not crucial, so long as they are distributed throughout the image. In the preferred embodiment, 200 to 300 tiepoints are selected, but alternatively other quantities may be used.

Defining a criterion for selecting the "best" match between regions can be done in numerous ways. In the preferred embodiment, as described above, the cross correlation procedure is used and cross correlation numbers are computed between regions around the tiepoints in the reference image 205 and the corresponding plausible region 502 in the object image 210. However, it should be understood that alternative methods may be used to determine location links in the object image tying that location to a tiepoint in the reference image.

Figure 13:
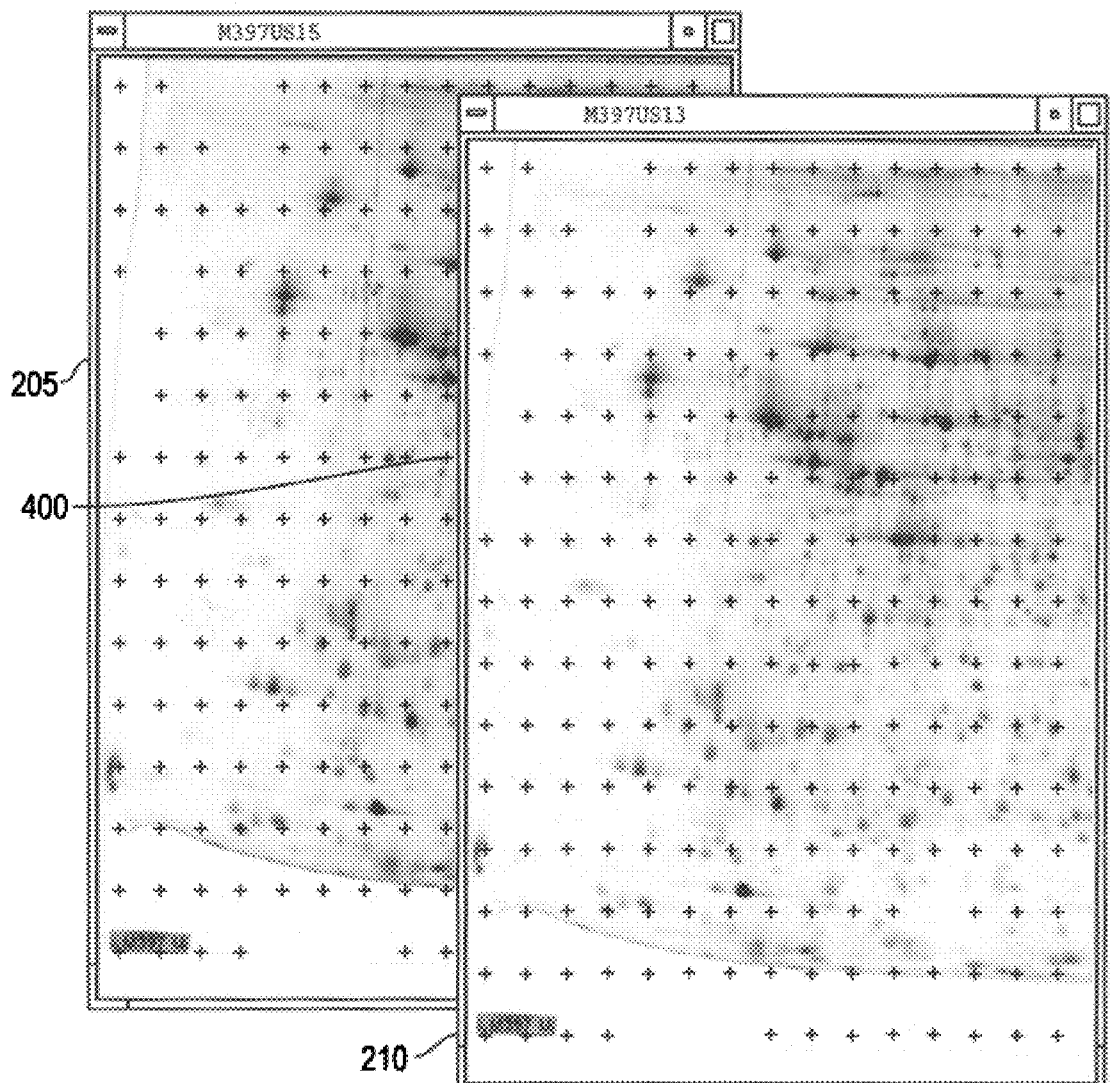
FIG. 13 is similar to FIGS. 12A and 12B showing larger portions of the two electrophoresis images, with a plurality of evaluated tiepoint locations assigned to locations in the images in accordance with one embodiment of the present invention.
Figure 14:
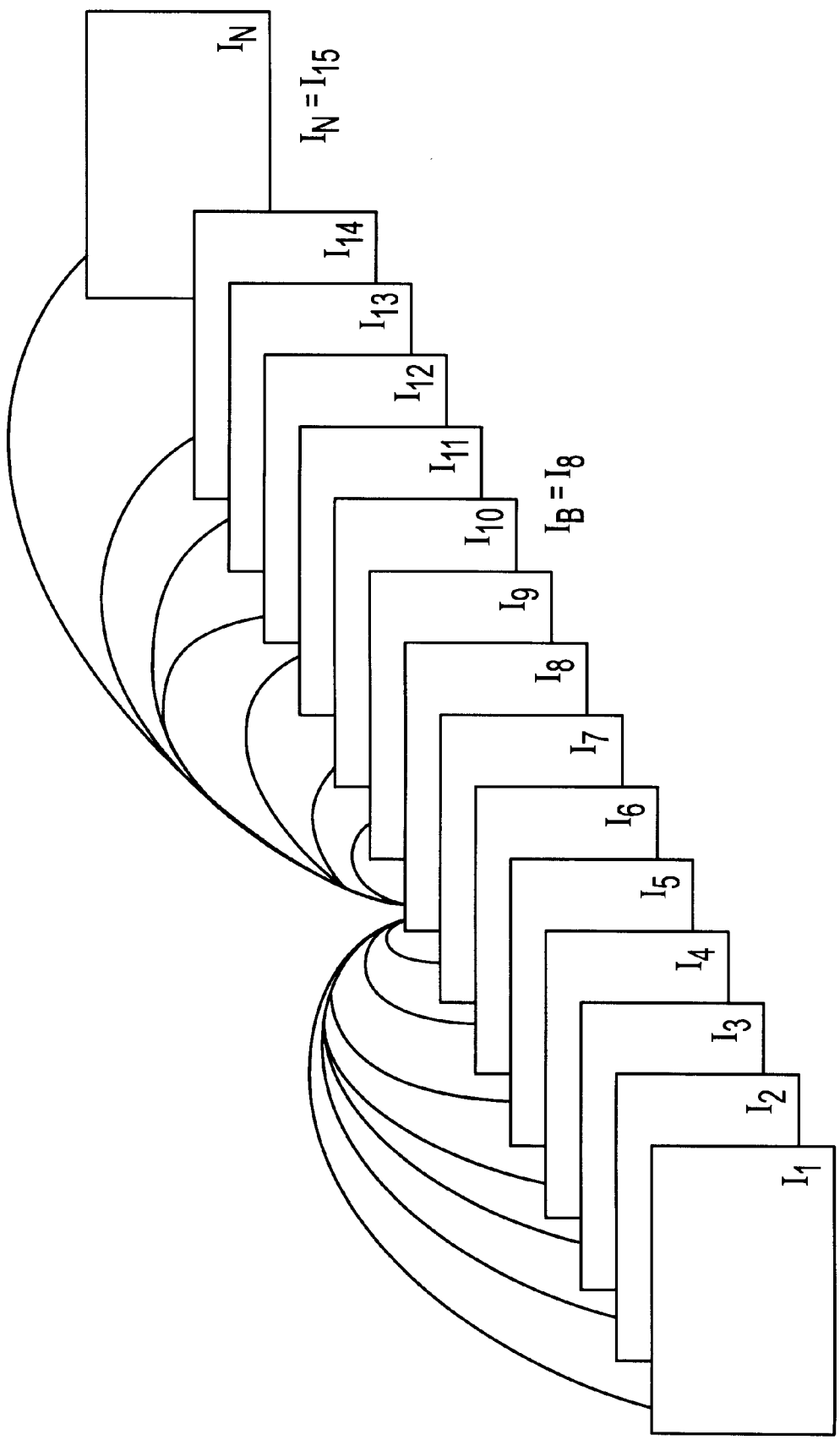
FIG. 14 is a block diagram showing a plurality of electrophoresis images grouped in pairs for tiepoint evaluation in accordance with one embodiment of the present invention.
Figure 15:
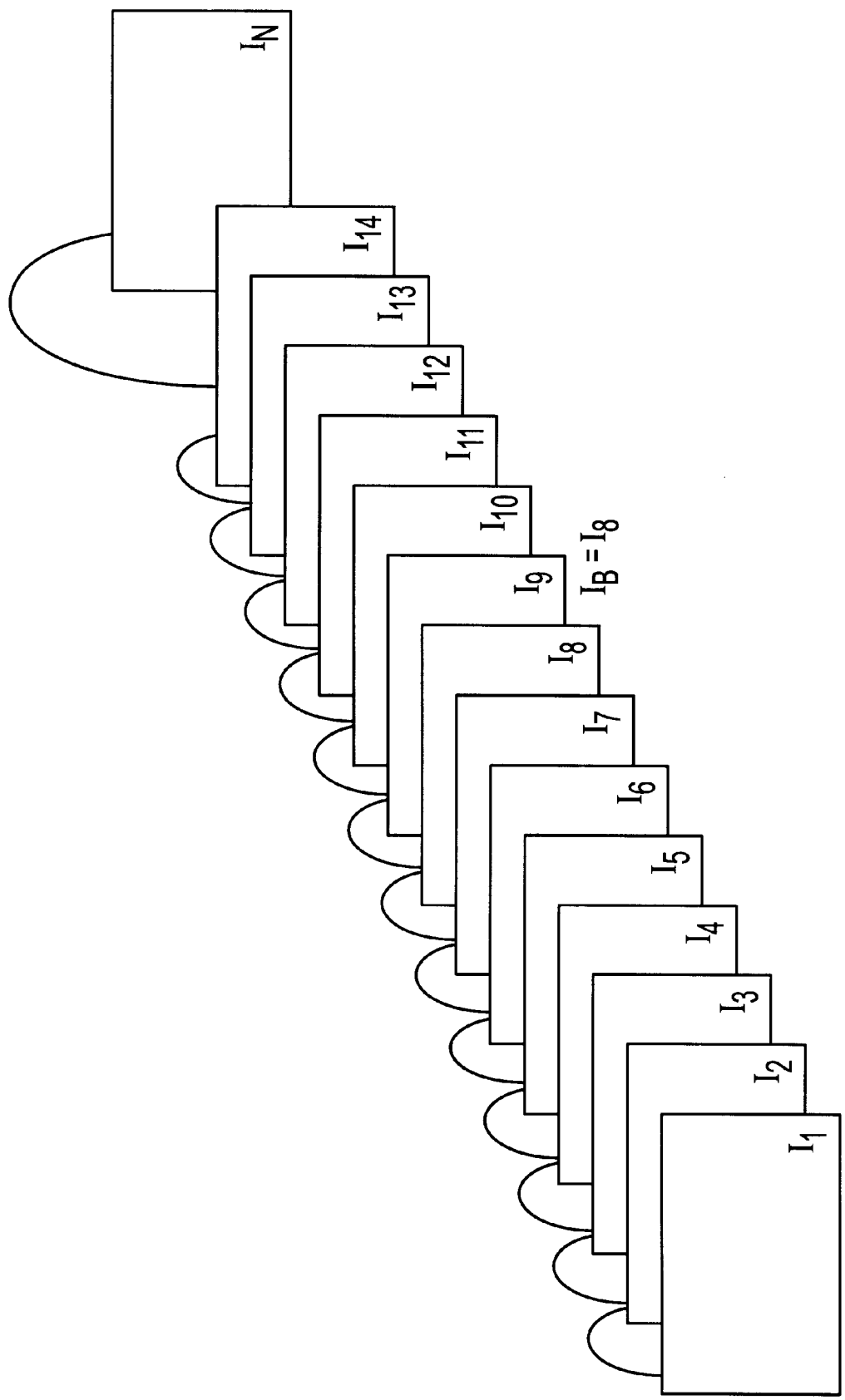
FIG. 15 is a block diagram showing another example of a plurality of electrophoresis images grouped for tiepoint evaluation in accordance with one embodiment of the present invention.

FIG. 13 shows large portions of the two images, reference image 205 and the object image 210, that have been evaluated. The reference image 205 was assigned tiepoints and the object image evaluated to find corresponding tiepoint locations to link features in the object image 210 to the reference image 205. Visual inspection of the object image 210 shows a pattern of spots similar to the pattern in the reference image 205.

As shown in FIG. 13, the grid of tiepoints is not complete because some tiepoint pairs (outliers) were rejected (see step S22, FIG. 7 and the process described with respect to FIG. 8). Tiepoints are retained only if plausible regions in the object image are found to correlate with corresponding tiepoint regions in the reference image 205.

In the preferred embodiment, it is required that the distance in the X dimension for any object image pixel to its nearest tiepoint is within 20% of the width of the image, and similarly for the Y dimension.

Remove Outliers from Tiepoint List (Step S22 of FIG. 6)

In order to test the validity of each confirmed tiepoint pair in the tiepoint list, further evaluation of each confirmed tiepoint is conducted. FIG. 8 is a flowchart showing steps of the outlier rejection process corresponding to step S22 in FIG. 6. The outlier rejection process ensures the use of a consistent set of tiepoints linking each object image to its corresponding reference image. In step S60, the object image tiepoint positions are fitted with mathematical functions using the reference image tiepoint positions as the dependent variables. Many possible mathematical functions may be used to create the warping functions. Such functions are disclosed in, for instance, DIGITAL IMAGE WARPING by George Wolberg, IEEE Computer Society Press, 1990, which is incorporated herein by reference in its entirety.

In step S61 the distance $d_n$ is calculated between each object image tiepoint position to a predicted position (i.e., a warped object image pixel location as given by the warping functions described below).

In step S62, the standard deviation of these distances $d_n$ (one for each confirmed tiepoint pair) is calculated.

In step S63, the tiepoint with the largest distance $d_{max}$ is found.

In step S64, a determination is made whether or not a tiepoint meets rejection criteria. The determination includes whether or not the distance $d_{max}$ is greater than a threshold $t_a$ and if the tiepoint distance $d_{max}$ from its predicted position is greater than $t_a$ times the standard deviation of distances. If the tiepoint is not to be rejected, then operation returns to step S23, FIG. 6. If the tiepoint is rejected, then operation proceeds to step S65 where another determination is made. In step S65, if too many tiepoints have been removed and a reliable warp is not possible for particular image, then at step S66 all tiepoints connecting the object image being considered to other images are removed and operation returns to step S23 in FIG. 6. If too many tiepoints have not been removed, then operation goes to step S67 where the unacceptable tiepoint pair is removed. Next, operation returns to step S64 for re-consideration of the remaining tiepoints.

In the preferred embodiment, the factor $t_a$ is set to 3, although the value of $t_a$ may range from 2 to 4 pixels.

Creation of Warping Functions (FIG. 5 Step S6)

Returning now to FIG. 5, at step S6, a warping function is created based upon the relationship between the tiepoint pairs in the tiepoint pair list. A unique warping function is created for each object image to be warped. The warping function is a mathematical method for predicting coordinates in the object images corresponding to pixel positions in the base image. The warping function is preferably a polynomial function, and is typically a second order polynomial function. For example, the polynomial may take the form of equations for both a predicted X coordinate $X_P$ and a predicted Y coordinate $Y_P$. For the quadratic polynomial case the predicted X coordinate $X_P$ of the warping function is:

$$X_P = C_0 + C_1 X_B + C_2 Y_B + C_3 X_B^2 + C_4 X_B Y_B + C_5 Y_B^2 \qquad (1)$$

and the predicted Y coordinate $Y_P$ is:

$$Y_P = D_0 + D_1 X_B + D_2 Y_B + D_3 X_B^2 + D_4 X_B Y_B + D_5 Y_B^2 \qquad (2)$$

Here $(X_B, Y_B)$ represents the pixel position in the base image corresponding to pixel position $(X_P, Y_P)$ in the object image being warped. In the preferred embodiment, the coefficients $C_0 \ldots C_5$ and $D_0 \ldots D_5$ are optimized coefficients that may be derived by any of a variety of methods. For instance, the coefficients may be derived through experimentation or computed with a least-squares minimization procedure, using the tiepoint data. However, other numerical analysis procedures may be used if desired. The number of terms used may be increased or decreased as needed. As the number of terms is increased, the relative accuracy of the polynomial function will increase, but will require more tiepoints, and better coverage. Applicable procedures for calculating the coefficients may be found in the book Numerical Recipes in FORTRAN, The Art of Scientific Computing, 2nd edition W. H. Press, S. A. Teukolsky, W. T. Vetterling, B. P. Flannery, Cambridge University Press, 1992, PP. 665–675, herein incorporated by reference.

It should be understood that the two example equations above, $X_P$ and $Y_P$ are just one possible set of equations each having only six parameters (coefficients $C_0 \ldots C_5$ and $D_0 \ldots D_5$). A greater or lesser number of parameters are possible and different functions depending upon the numeric analysis method utilized to solve the variables.

In a manner similar to the mathematical evaluation described above, it is also possible to solve for $X_B$ and $Y_B$ in an iterative process if $X_P$ and $Y_P$ are known. Solving for $X_B$ and $Y_B$ with $X_P$ and $Y_P$ being known provides an inverse of the warping functions used in the global removal of outliers described above with respect to step S8 above.

Global Optimization of Warping Functions

In FIG. 5 at step S7, the warping function parameters are optimized in a manner more fully described here with reference to the flowcharts in FIGS. 9 and 10.

In FIG. 9, at step S80, parameters of the warping functions are initialized. For instance, the coefficients $C_1$ and $D_2$ are initially set at 1 and all other coefficients are set to 0 for optimization. At step S81, an evaluation function E is used to optimize the parameters $C_0 \ldots C_5$ and $D_0 \ldots D_5$. In the present invention, the function E is as follows:

$$E = \text{Sum of Squares}/(N_{TP} - N_{Par} - 1)$$

where the Sum of Squares is calculated as set forth below with respect to FIG. 10;

$N_{TP}$ represents the number of tiepoints for an image pair (evaluated as set forth in the description of the operational steps shown in FIG. 7);

$N_{Par}$ represents the number of parameters $C_0 \ldots C_5$ and $D_0 \ldots D_5$ in the warping functions; and $\tau$ is a preset threshold.

At step S81, the optimization procedure commences, including repeatedly calling of the evaluation function E that is described below with reference to FIG. 10. First in step S81 incremental adjustments are made to the coefficients $C_0 \ldots C_5$ and $D_0 \ldots D_5$ in the warping functions in an iterative process. After each iteration, the evaluation function E is implemented to test the adjusted coefficients.

At FIG. 9, step S82 a determination is made. If E is greater than $\tau$, then the optimization was not successful and an error condition is returned to step S7 in FIG. 5 and the results outputted at step S11 include an indication of the error condition.

If E is greater than $\tau$, then the optimization was successful. At step S82, operation then returns to step S7 in FIG. 5.

Optimization (S81 FIG. 9)

The operations when the evaluation function E is called at step S81 in FIG. 9 are further described below with respect to FIG. 10.

At step S90, in FIG. 10, a sum of all squares is set to zero. At step S91, a first tiepoint pair (from one pair of images of the reference image 205 and object image 210 evaluations) are selected for use in the optimization procedure.

Figure 18:
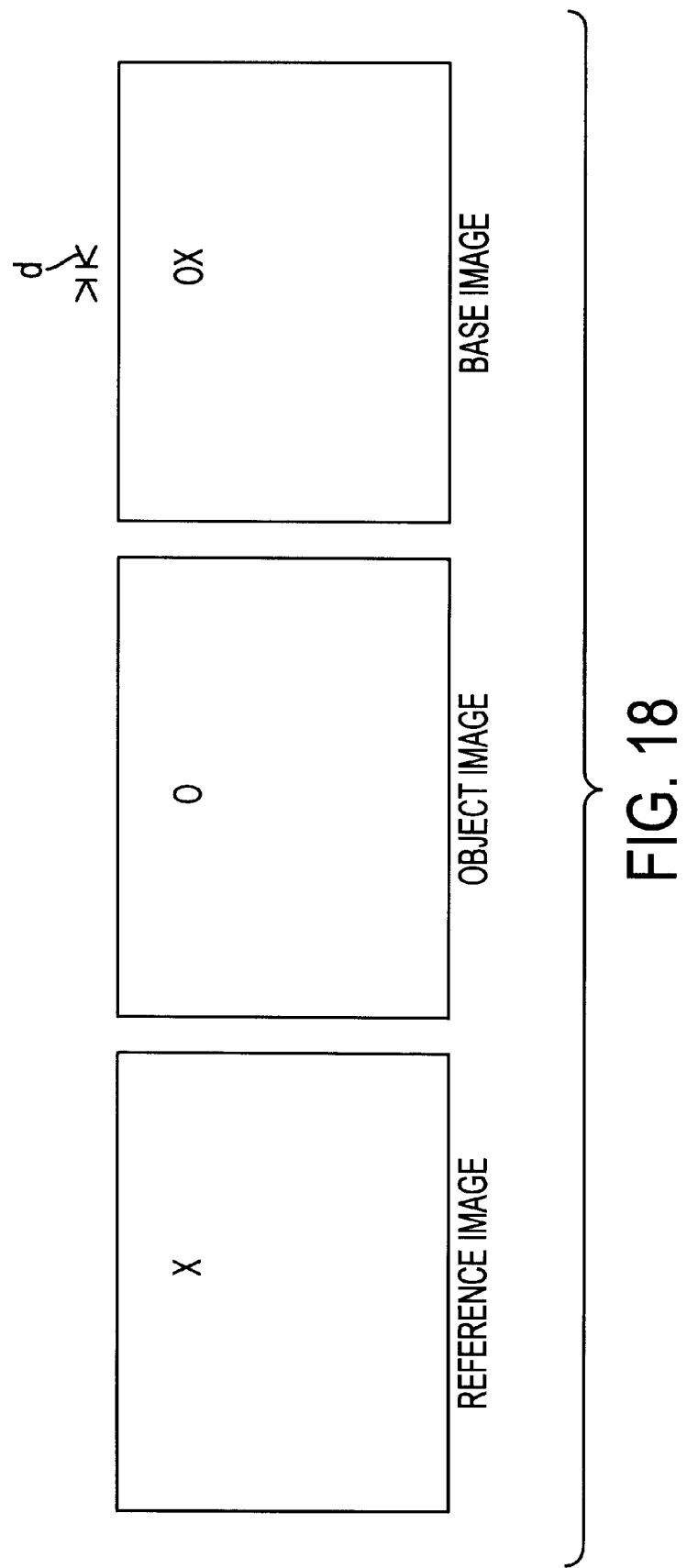
FIG. 18 is a graphical representation of tiepoint pairs from reference and object images projected back onto a base image for optimizing warping function parameters in accordance with one embodiment of the present invention.

At step S92, the first tiepoint x in the selected reference image is projected onto a location in the base image (see FIG. 18). In other words, using the results of the tiepoint evaluation (described with respect to FIG. 7), the location of the tiepoint in the reference image is projected back on to the base image.

At step S93, the corresponding first tiepoint ○ in the selected object image is also projected onto a location in the base image. In other words, using the results of the tiepoint evaluation (described with respect to FIG. 7), the location of the tiepoint ○ in an object image is projected back on to the base image using the inverses of the warping functions $X_P$ and $Y_P$ discussed above. Typically, the location of the projected tiepoint in the base image is not 100% exact and may be off slightly from the location of the reference image tiepoint x, as is indicated in FIG. 18.

Next, at step S94, the distances between the two projected locations of the tiepoints x and ○ are computed. At step S95, the squares of the distances are summed. At step S96, a decision is made. Are there more tiepoint pairs to be considered from the various reference and object images previously evaluated? If yes, the next tiepoint pair is selected and the process returns to step S92. If completed, then E is computed and the coefficients of $C_0$–$C_5$ and $D_0$–$D_5$ are adjusted accordingly. Thereafter, operation proceeds to step S82 in FIG. 9.

Warping

In FIG. 5, at step S10, pixels in the object images are warped. In application, this means that, for each portion of each image being processed, the image intensity values of pixels are recomputed so that a pixel or a pattern of pixels is physically relocated. The relocation of pixels is accomplished for each pixel in the base image by entering its coordinates into the warping function to give the predicted location of the pixel in the object image that is being warped. The image intensity value in the warped image is interpolated from the pixel intensity values surrounding the predicted position of the pixel in the object image. In this manner, the plurality of warp images may be warped and made to align with the base image. Many applicable procedures for warping may be found in DIGITAL IMAGE WARPING by George Wolberg, IEEE Computer Society Press, Los Alamitos Calif., 1990, which is also incorporated herein by reference.

Figure 19:
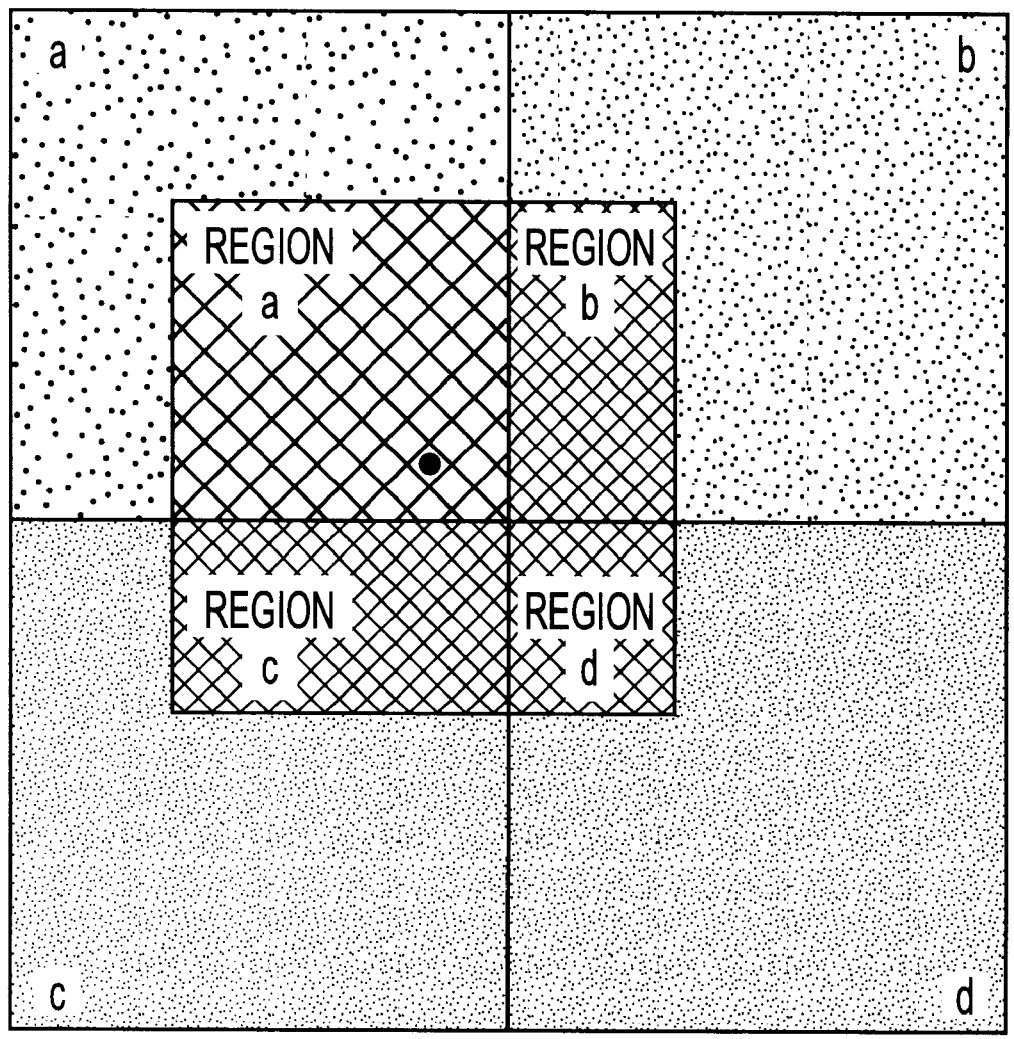
FIG. 19 shows a block of four pixels illustrating a method for interpolating a new pixel in a warped image based upon the information in the four pixels in accordance with one embodiment of the present invention.

FIG. 19 shows four pixels a, b, c, and d in the warp image, illustrating an interpolation procedure that is part of the warping process. As can be seen from FIG. 19, the cross-hatched region represents a pixel warped into a new position. The new warped position does not fall onto one of the existing pixels a, b, c, or d. Therefore, the intensity value of the relocated pixel must be computed from the pixels a, b, c, and d by an interpolation procedure. In the preferred embodiment, the warped pixel Pw may be interpolated by use of the formula:

$$P_w = (A_a)(V_a) + (A_b)(V_b) + (A_c)(V_c) + (A_d)(V_d) \qquad (3)$$

where $V_a$, $V_b$, $V_c$, and $V_d$ are intensity values of respective pixels and $A_a$, $A_b$, $A_c$, and $A_d$ are the areas of respective pixels overlapped by the warped pixel $P_w$. The areas of all of the pixels are assumed to be 1. Then a normalization factor is applied to the warped pixel values to conserve the total of the pixel values as the region is stretched or compressed. This is generally a minor correction and accounts for the fact that the warped pixels are not really the same size as the object pixels.

The method is performed by the computer 1006 and may be in the form of a software program loaded into memory in the computer, or may be stored on a storage device such as a hard drive, CDROM, ZIP disk or floppy disk. Alternatively, the computer may be provided with special memory chips with command codes permanently installed to facilitate the operations described below.

It is contemplated that the present invention may be applicable to any macromolecular analysis using stains that bind to macromolecular components. For example, image analysis is appropriate to both visible stains and to fluorescent stains that are only visible when illuminated. Other macromolecular analysis applications where the present invention may be employed over multiple images are in X-ray diffraction, gradient analysis, cell cultures, and bacterial growth. In X-ray diffraction a sample is bombarded with X-rays and a diffraction pattern produced by the sample is analyzed. In gradient analysis a sample is separated across a gradient according to various chosen factors such as molecular weight, pH factor, etc. The present invention may be used in cell cultures to detect or highlight cell changes over time, such as drug absorption or effectiveness, for example. In addition, the present invention may be used to detect bacterial growth or reduction in order to determine, for example, susceptibility to antibiotics.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computer implemented image processing method for warping a plurality of homologous gel electrophoresis images, comprising the steps of:

assigning multiple tiepoints in each of the homologous images, each tiepoint connecting a region of one image to an approximate corresponding region of one other image, said tiepoints being assigned in corresponding predetermined regions of the two images irrespective of the characteristics of said regions;

adjusting tiepoint locations to maximize similarities between regions;

creating warping functions based upon at least some of the tiepoints; and warping each of the images using the warping functions to bring the tiepoints of each of the plurality of images into close alignment.

2. The computer-implemented image processing method of claim 1, further comprising a step of rejecting those tiepoints that are outliers.

3. The computer-implemented image processing method of claim 1, further comprising a step of optimizing the warping functions before said warping step.

4. The computer-implemented image processing method of claim 1, further comprising a step of selecting a base image from the plurality of images.

5. The computer-implemented image processing method of claim 4, wherein said plurality of images were taken of one gel electrophoresis sample over time.

6. The computer-implemented image processing method of claim 5, wherein said base image is a middle image in said plurality of gel electrophoresis images with respect to time.

7. The computer-implemented image processing method of claim 4, wherein said plurality of images were taken of one gel electrophoresis sample over a plurality of exposures.

8. The computer-implemented image processing method of claim 7, wherein said base image is a middle image in said plurality of gel electrophoresis images with respect to exposure.

9. The computer-implemented image processing method of claim 4, wherein said warping function aligns all tiepoints in all other images to corresponding tiepoints in said base image.

10. The computer-implemented image processing method of claim 4, wherein an a image intensity value of a warped pixel is distributed among one or more target pixels in order to warp said warped pixel to said base image.

11. The computer-implemented image processing method of claim 1, wherein said plurality of images were taken of a plurality of gel electrophoresis samples.

12. The computer-implemented image processing method of claim 1, wherein said gel electrophoresis is a two-dimensional gel electrophoresis slab.

13. The computer-implemented image processing method of claim 1, wherein adjustment of tiepoints is effected in pairs of images.

14. The computer-implemented image processing method of claim 13, wherein said pairs are non-sequential pairs of images.

15. The computer-implemented image processing method of claim 13, wherein said pairs are sequential pairs of images.

16. The computer-implemented image processing method of claim 15, wherein said plurality of images are obtained at irregular time intervals.

17. The computer-implemented image processing method of claim 1, wherein said plurality of electrophoresis images are obtained at predetermined time intervals.

18. The computer-implemented image processing method of claim 17, wherein said predetermined time intervals are fixed time intervals.

19. The computer-implemented image processing method of claim 17, wherein said predetermined time intervals are randomly determined time intervals.

20. The computer-implemented image processing method of claim 1, wherein each of said images comprises a plurality of spots, each of said spots representing an occurrence of a protein.

21. The computer-implemented image processing method of claim 1, wherein each of said images comprises a plurality of spots, each of said spots representing an occurrence of a nucleic acid.

22. The computer-implemented image processing method of claim 1, wherein said adjusting tiepoints step further includes the steps of:

calculating a correlation number for a plurality of tiepoints for each region of the one image with each corresponding region of the one other image;

choosing a maximum correlation number as a tiepoint location in said object image; and recording a position of said corresponding region having said maximum correlation number.

23. The computer-implemented image processing method of claim 22, wherein the step of calculating said correlation number includes calculating said correlation number using a fast Fourier transform.

24. The computer-implemented image processing method of claim 1, wherein said assigning tiepoints step includes initially assigning a grid of substantially evenly spaced (x,y) coordinates as said tiepoints in'said one image.

25. The computer-implemented image processing method of claim 1, wherein the warping step includes an interpolation of a warped pixel.

26. A computer-implemented image processing apparatus for warping a plurality of gel electrophoresis images, comprising:

an image capturing device; and a computer having a memory and configured to communicate with said image capturing device, said computer capable of receiving and storing into said memory a plurality of gel electrophoresis images from said image capturing device, said computer being further configured for warping said plurality of gel electrophoresis images by assigning multiple tiepoints in each of the homologous images, each tiepoint connecting a region of one image to an approximate corresponding region of one other image, said tiepoints being assigned in corresponding predetermined regions of the two images irrespective of the characteristics of said regions, adjusting tiepoint locations to maximize similarities between regions, creating warping functions based upon at least some of the tiepoints, and warping each of the images using the warping functions to bring the tiepoints of each of the plurality of images into close alignment.

27. The computer-implemented image processing apparatus of claim 26, wherein said computer is configured to select a base image and warp said plurality of gel electrophoresis images into alignment with said base image.

28. The computer-implemented image processing apparatus of claim 26, wherein said image capturing device is a digital camera.

29. The computer-implemented image processing apparatus of claim 26, wherein said image capturing device is a video camera.

30. The computer-implemented image processing apparatus of claim 26, wherein said image capturing device is a scanner.

31. The computer-implemented image processing apparatus of claim 26, wherein said plurality of gel electrophoresis images are stored in said memory.

32. The computer-implemented image processing apparatus of claim 26, further including an output device for outputting a plurality of warped gel electrophoresis images.

33. The computer-implemented image processing apparatus of claim 26, further including a printer.

34. The computer-implemented image processing apparatus of claim 26, further including a display.

35. The computer-implemented image processing apparatus of claim 26, further including a communications link connected to said computer and over which a plurality of warped gel electrophoresis images may be transferred to a remote location.

36. The computer-implemented image processing apparatus of claim 26, is further configured to reject those tiepoints that are outliers.

37. The computer-implemented image processing apparatus of claim 26, is further configured optimize the warping functions before said warping step.

38. The computer-implemented image processing apparatus of claim 37, wherein said plurality of images were taken of one gel electrophoresis sample over time.

39. The computer-implemented image processing apparatus of claim 38, wherein said gel electrophoresis is a two-dimensional gel electrophoresis slab.

40. A computer implemented image processing method for warping a plurality of homologous gel electrophoresis images, comprising the steps of:

assigning multiple tiepoints in each of the homologous images, each tiepoint connecting a region of one image to an approximate corresponding region of one other image;

adjusting tiepoint locations to maximize similarities between regions;

creating warping functions based upon at least some of the tiepoints; and warping each of the images using the warping functions to bring the tiepoints of each of the plurality of images into close alignment;

wherein said adjusting tiepoints step further includes the steps of calculating a correlation number for a plurality of tiepoints for each region of the one image with each corresponding region of the one other image;

choosing a maximum correlation number as a tiepoint location in said object image; and recording a position of said corresponding region having said maximum correlation number;

wherein each of said images is defined by a plurality of pixels, and said choosing step further includes the steps of comparing said maximum correlation number to a predetermined threshold; and determining whether cross-correlation numbers for adjacent pixels decrease monotonically away from said maximum correlation number for a predetermined number of pixels.

41. The computer-implemented image processing method of claim 40, wherein said predetermined threshold includes a correlation number ranging from about 0.4 to about 0.8.

42. The computer-implemented image processing method of claim 40, wherein said predetermined threshold is 0.65.

43. The computer-implemented image processing method of claim 40, wherein said cross-correlation numbers for neighboring points decrease monotonically away from said maximum correlation number for 4 pixels.

44. A computer implemented image processing method for warping a plurality of homologous gel electrophoresis images, comprising the steps of:

assigning multiple tiepoints in each of the homologous images, each tiepoint connecting a region of one image to an approximate corresponding region of one other image;

adjusting tiepoint locations to maximize similarities between regions;

creating warping functions based upon at least some of the tiepoints; and warping each of the images using the warping functions to bring the tiepoints of each of the plurality of images into close alignment;

wherein a predicted X coordinate $X_P$ of said warping function is $X_P=C_0+(C_1)(X_b)+(C_2)(Y_b)+(C_3)(X_B^2)+(C_4)(X_B)(Y_B)+(C_5)(Y_B^2)$, and wherein a predicted Y coordinate $Y_P$ of said warping function is $Y_P=D_0+(D_1)(X_B)+(D_2)(Y_B)+(D_3)(X_B^2)+(D_4)(X_B)(Y_B)+(D_5)(Y_B)+(D_5)(Y_B^2)$, where $C_0 \ldots C_5$ and $D_0 \ldots D_5$ are optimized coefficients.

45. A computer implemented image processing method for warping a plurality of homologous gel electrophoresis images, comprising the steps of:

assigning multiple tiepoints in each of the homologous images, each tiepoint connecting a region of one image to an approximate corresponding region of one other image;

adjusting tiepoint locations to maximize similarities between regions;

creating warping functions based upon at least some of the tiepoints; and warping each of the images using the warping functions to bring the tiepoints of each of the plurality of images into close alignment;

wherein the warping step interpolates a warped pixel $P_w$ into four adjacent pixels a, b, c, and d having intensity values $V_a$, $V_b$, $V_c$, and $V_d$ and having respective overlapping regions $A_a, A_b, A_c,$ and $A_d$ according to the formula $P_w=(A_a)(V_a)+(A_b)(V_b)+(A_c)(V_c)+(A_d)(V_d)$.

46. A computer implemented image processing method for warping a plurality of homologous gel electrophoresis images, comprising the steps of:

assigning multiple tiepoints in each of the homologous images, each tiepoint connecting a region of one image to an approximate corresponding region of one other image;

adjusting tiepoint locations to maximize similarities between regions;

creating warping functions based upon at least some of the tiepoints; and warping each of the images using the warping functions to bring the tiepoints of each of the plurality of images into close alignment;

wherein said rejecting step further includes the steps of
calculating functions to predict object image tiepoints from reference image tie points;
calculating distances between predicted object image tiepoints and actual object image tiepoints;
calculating standard deviation of said distances; and
rejecting object image tiepoint as an outlier if said distance fails to meet rejection criteria.

47. A computer implemented image processing method for warping a plurality of homologous gel electrophoresis images, comprising the steps of:

assigning multiple tiepoints in each of the homologous images, each tiepoint connecting a region of one image to an approximate corresponding region of one other image;

adjusting tiepoint locations to maximize similarities between regions;

creating warping functions based upon at least some of the tiepoints; and warping each of the images using the warping functions to bring the tiepoints of each of the plurality of images into close alignment;

wherein said optimizing step further includes the steps of
creating inverse warping functions;
projecting object image tiepoints to the base image;
projecting reference image tiepoints to the base image;
calculating distances between the object image tiepoint projections and reference image tiepoint projections;
calculating standard deviation of said distance; and
rejecting object image tiepoints as outliers if said distances fails to meet rejection criteria.

48. A computer-implemented image processing apparatus for warping a plurality of gel electrophoresis images, comprising:

an image capturing device; and a computer having a memory and configured to communicate with said image capturing device, said computer capable of receiving and storing into said memory a plurality of gel electrophoresis images from said image capturing device, said computer being further configured for warping said plurality of gel electrophoresis images;

wherein the computer-implemented image processing apparatus is configured to assign multiple tiepoints in each of the homologous images, each tiepoint connecting a region of one image to an approximate corresponding region of one other image, adjust tiepoint locations to maximize similarities between regions, create warping functions based upon at least some of the tiepoints, warp each of the images using the warping functions to bring the tiepoints of each of the plurality of images into close alignment, reject those tiepoints that are outliers, calculate functions to predict object image tiepoints from reference image tie points, calculate distances between predicted object image tiepoints and actual object image tiepoints, calculate standard deviation of said distances, and reject object image tiepoints as outliers if said distances fails to meet rejection criteria.

49. A computer-implemented image processing apparatus for warping a plurality of gel electrophoresis images, comprising:

an image capturing device; and a computer having a memory and configured to communicate with said image capturing device, said computer capable of receiving and storing into said memory a plurality of gel electrophoresis images from said image capturing device, said computer being further configured for warping said plurality of gel electrophoresis images.

wherein the computer-implemented image processing apparatus is configured to assign multiple tiepoints in each of the homologous images, each tiepoint connecting a region of one image to an approximate corresponding region of one other image, adjust tiepoint locations to maximize similarities between regions, create warping functions based upon at least some of the tiepoints, warp each of the images using the warping functions to bring the tiepoints of each of the plurality of images into close alignment, reject those tiepoints that are outliers, create inverse warping functions, project object image tiepoints to the base image, project reference image tiepoints to the base image, calculate distances between the object image tiepoint projections and reference image tiepoint projections, calculate standard deviation of said distance, and reject object image tiepoints as outliers if said distances fails to meet rejection criteria.

* * * * *